United States Patent
Yamashita

(10) Patent No.: US 8,856,614 B2
(45) Date of Patent: Oct. 7, 2014

(54) SEMICONDUCTOR MEMORY DEVICE DETECTING ERROR

(75) Inventor: Takahiro Yamashita, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 280 days.

(21) Appl. No.: 13/194,122

(22) Filed: Jul. 29, 2011

(65) Prior Publication Data

US 2012/0030441 A1 Feb. 2, 2012

(30) Foreign Application Priority Data

Jul. 29, 2010 (JP) .................................. 2010-171134
Mar. 18, 2011 (JP) .................................. 2011-061557

(51) Int. Cl.
*G11C 29/00* (2006.01)
*G06F 11/14* (2006.01)

(52) U.S. Cl.
CPC .......... *G06F 11/141* (2013.01); *G06F 11/1443* (2013.01)
USPC .......................................... 714/763; 714/752

(58) Field of Classification Search
CPC .. G06F 11/1076; G06F 11/1008; G11C 29/00
USPC ......... 714/763, 710, 711, 718, 719, 800, 819, 714/799, 758, 773
See application file for complete search history.

(56) References Cited

U.S. PATENT DOCUMENTS

| | | | | |
|---|---|---|---|---|
| 5,182,799 A | * | 1/1993 | Tamura et al. ................. | 711/216 |
| 5,748,873 A | * | 5/1998 | Ohguro et al. .................. | 714/11 |
| 6,259,639 B1 | * | 7/2001 | Hashizume .................... | 365/201 |
| 6,304,486 B1 | * | 10/2001 | Yano ......................... | 365/185.22 |
| 6,882,567 B1 | | 4/2005 | Wong | |
| 7,073,106 B2 | * | 7/2006 | Paredes et al. ................ | 714/720 |
| 7,139,673 B1 | * | 11/2006 | Vashi et al. .................... | 702/122 |
| 7,152,192 B2 | * | 12/2006 | Brummel et al. ............. | 714/718 |
| 7,213,185 B2 | * | 5/2007 | Barone et al. ................. | 714/733 |
| 7,394,685 B2 | | 7/2008 | Ooishi et al. | |
| 7,543,104 B2 | | 6/2009 | Kawamoto | |
| 8,339,832 B2 | * | 12/2012 | Kato ............................. | 365/104 |
| 8,516,172 B1 | * | 8/2013 | Karamcheti et al. ............ | 710/62 |
| 2003/0115414 A1 | * | 6/2003 | Tomita ......................... | 711/114 |
| 2005/0201177 A1 | * | 9/2005 | Shiraishi et al. .............. | 365/222 |
| 2007/0150780 A1 | * | 6/2007 | Shimooka ..................... | 714/726 |
| 2010/0274951 A1 | * | 10/2010 | Fang et al. ..................... | 711/103 |
| 2011/0093686 A1 | * | 4/2011 | Penton et al. ................. | 712/222 |

FOREIGN PATENT DOCUMENTS

JP 2001-176276 6/2001

* cited by examiner

*Primary Examiner* — Albert Decady
*Assistant Examiner* — Osman Alshack
(74) *Attorney, Agent, or Firm* — Oblon, Spivak, McClelland, Maier & Neustadt, L.L.P.

(57) ABSTRACT

According to one embodiment, a semiconductor memory device includes first to fifth units. The first unit compares first data being write target data before write in a memory, with second data written in the memory and then read out. The second unit stores the first data if a data comparison result indicates mismatch. The third unit stores a write address corresponding to the write target data if the data comparison result indicates mismatch. The fourth unit compares a read address corresponding to read target data with an address stored in the third unit. The fifth unit selects data read out from the memory in accordance with the read address as the read target data if a address comparison result indicates mismatch, and selects data read out from the second unit as the read target data if the address comparison result indicates match.

20 Claims, 17 Drawing Sheets

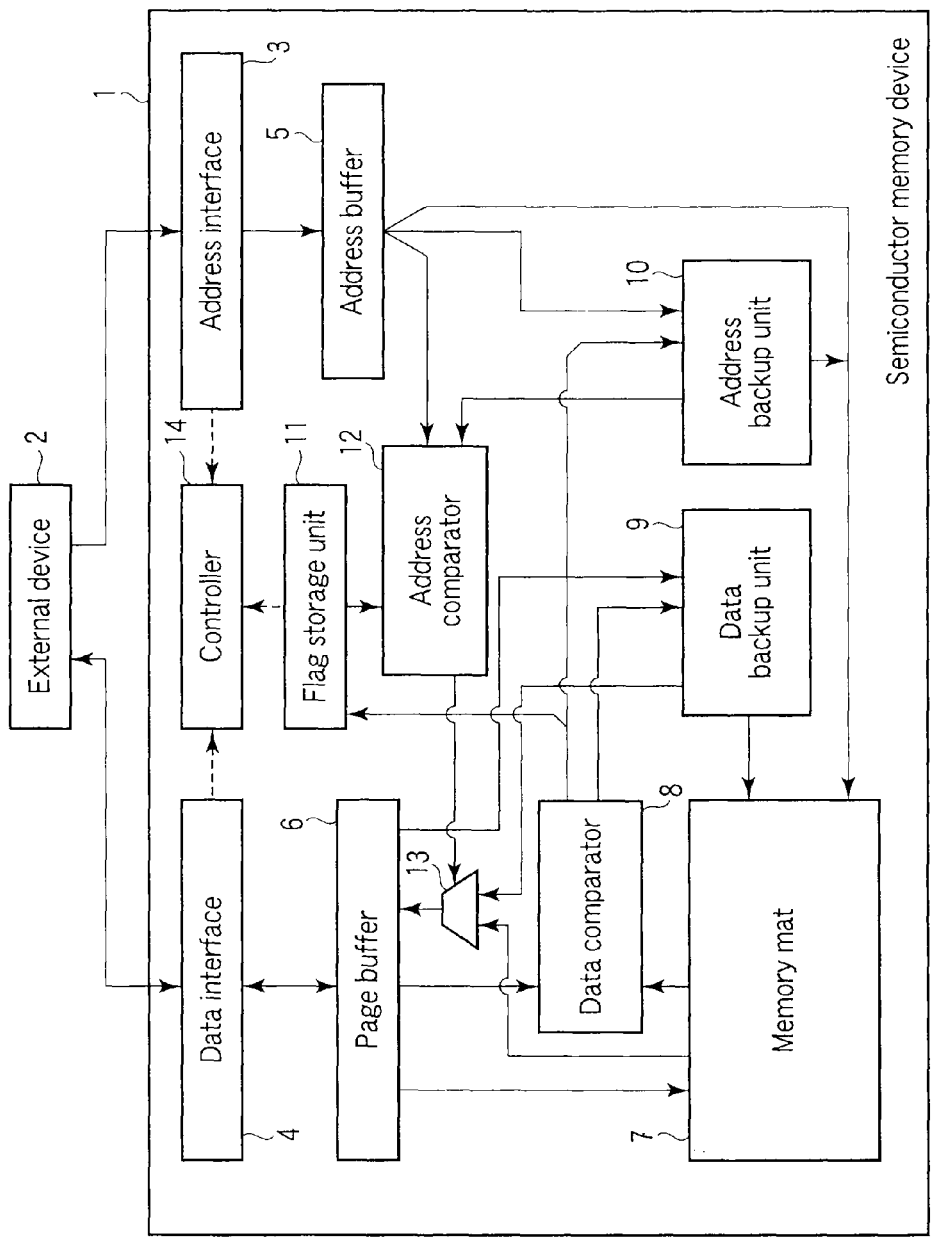
F I G. 1

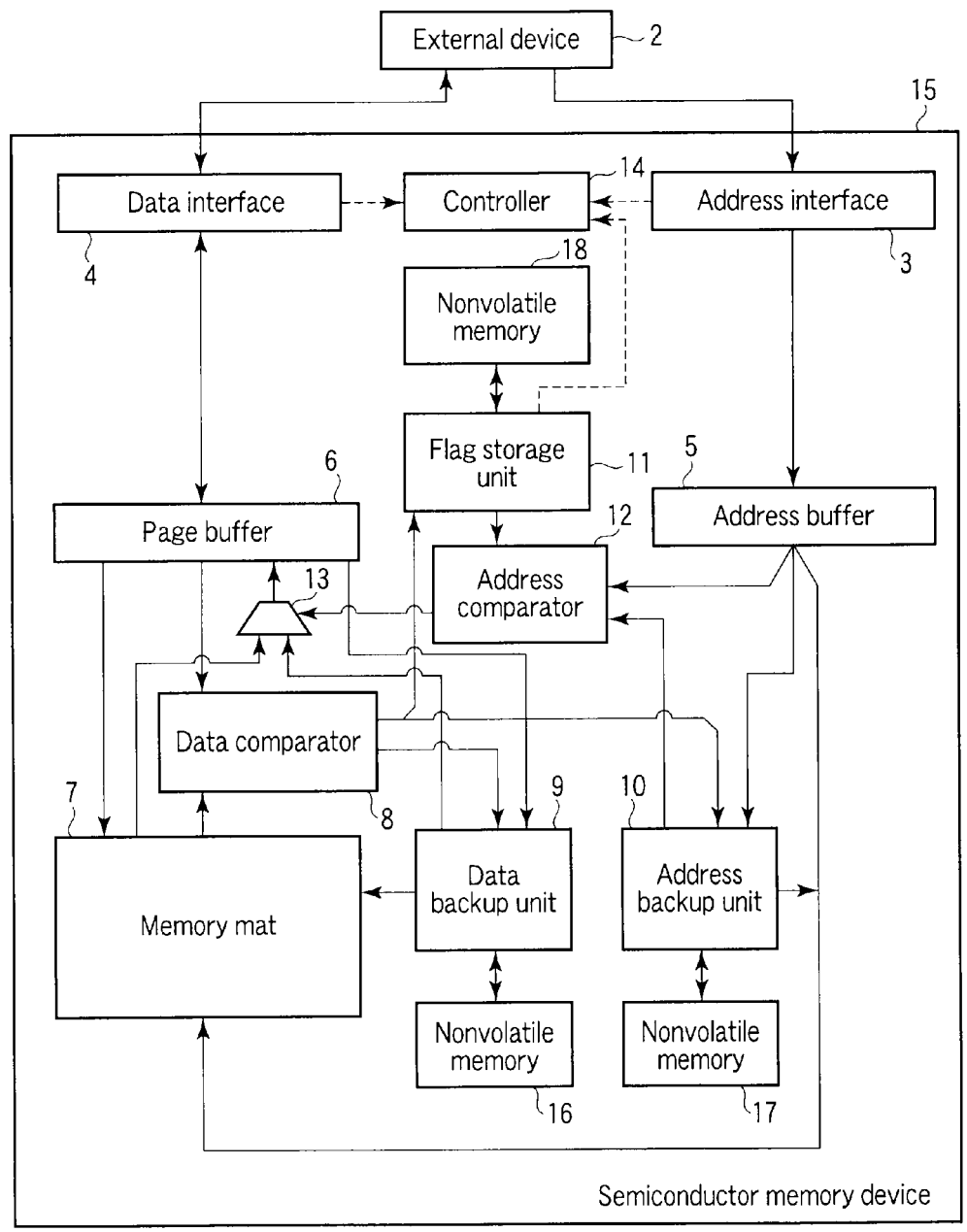
F I G. 6

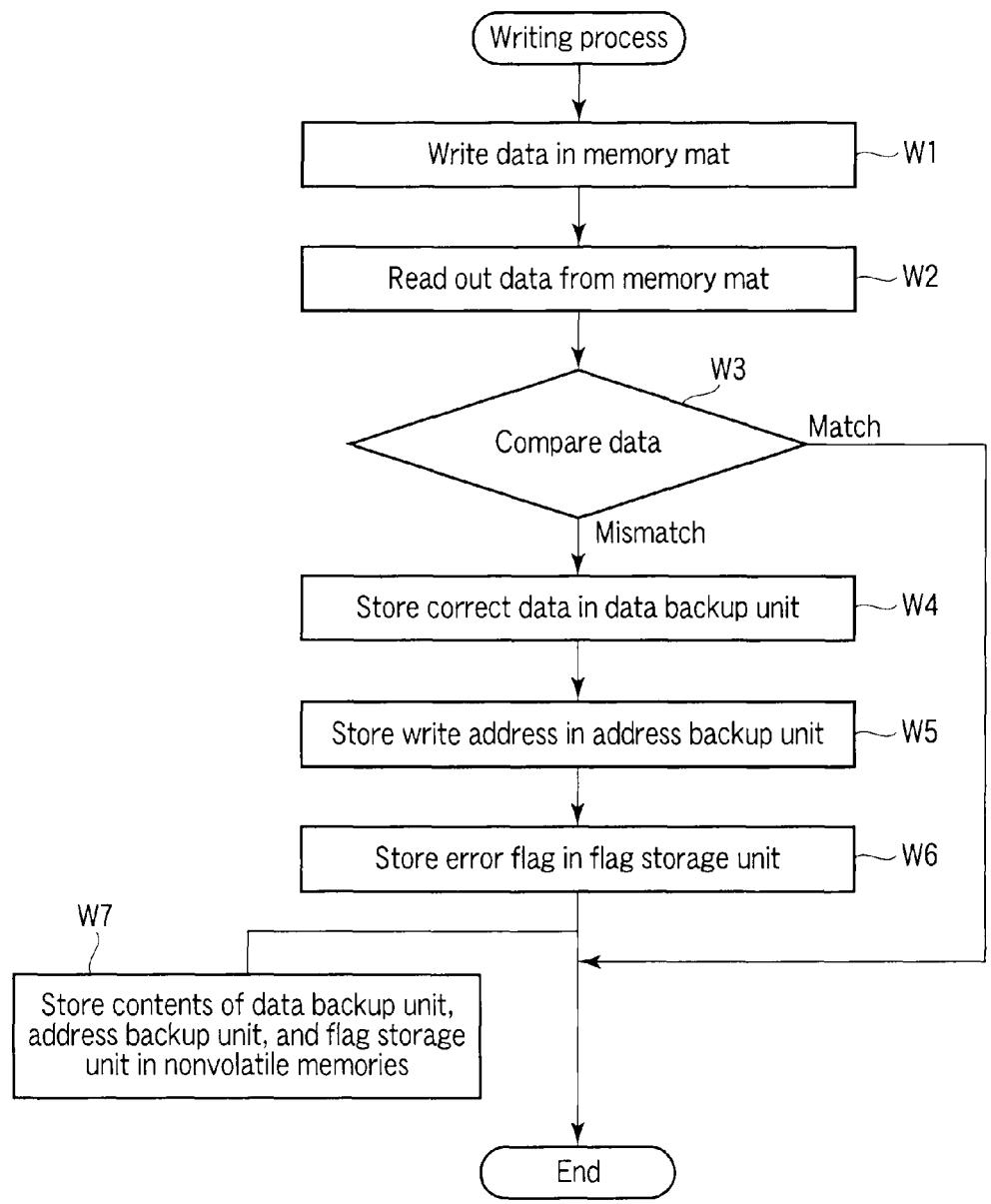
F I G. 7

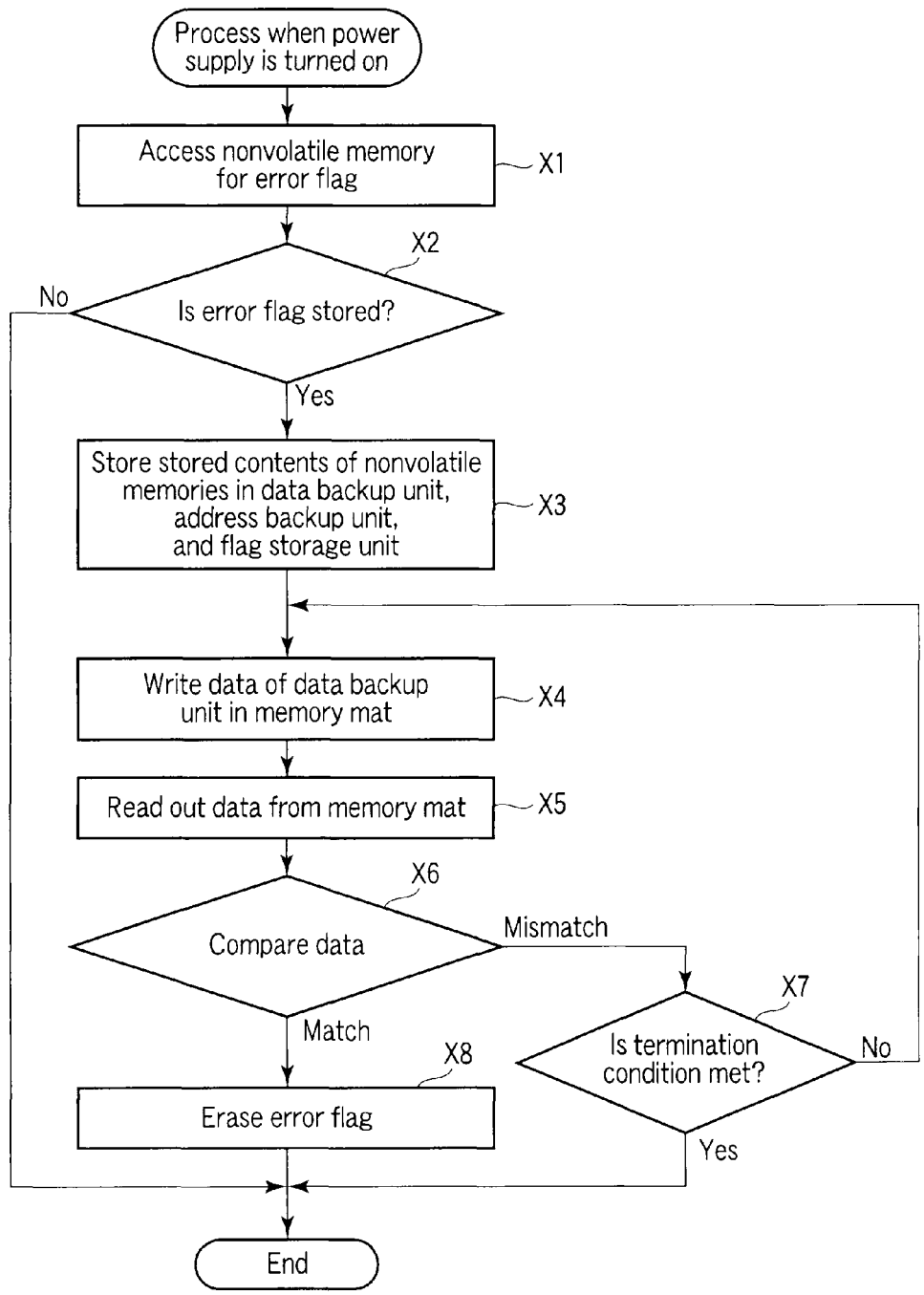
F I G. 8

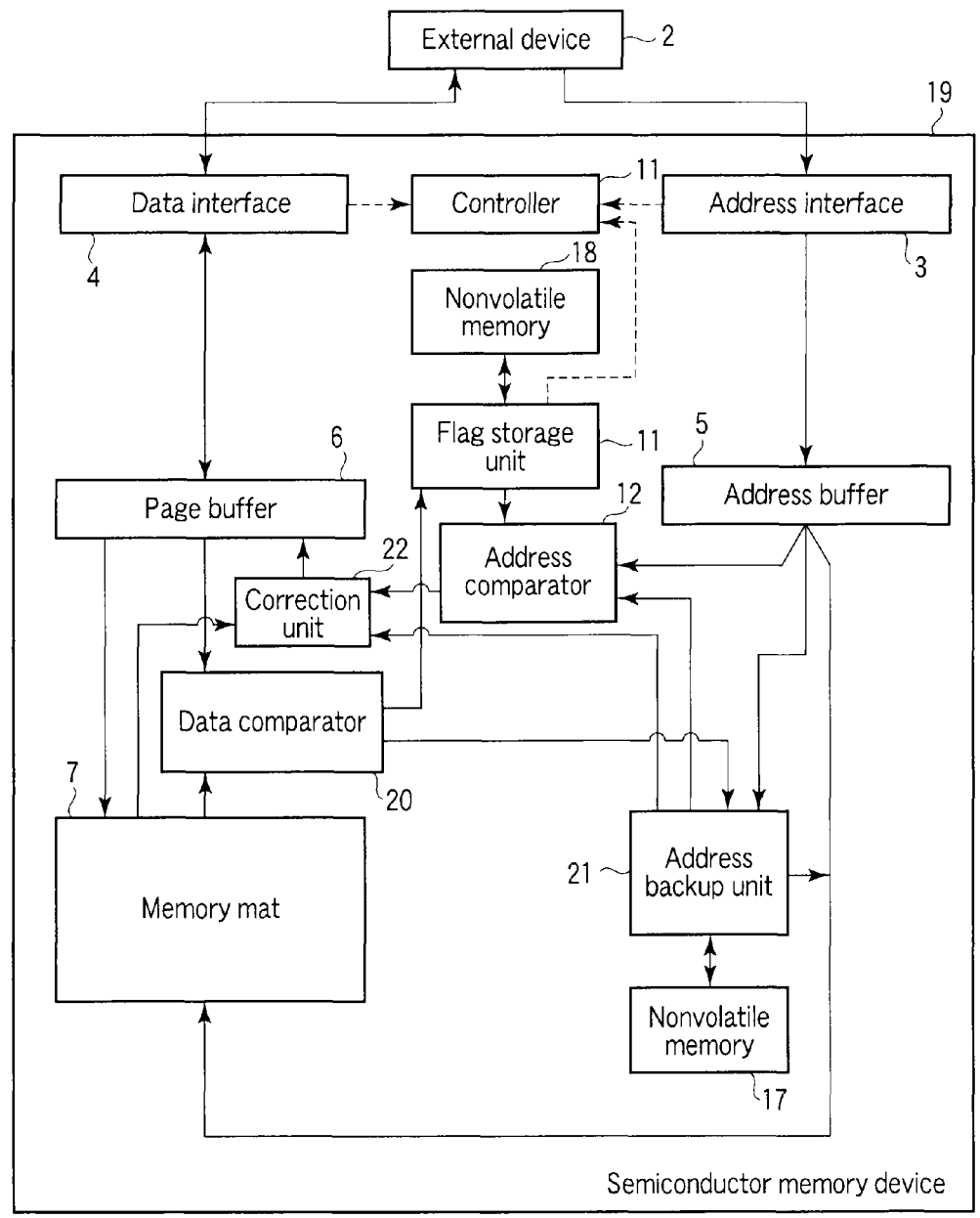
F I G. 9

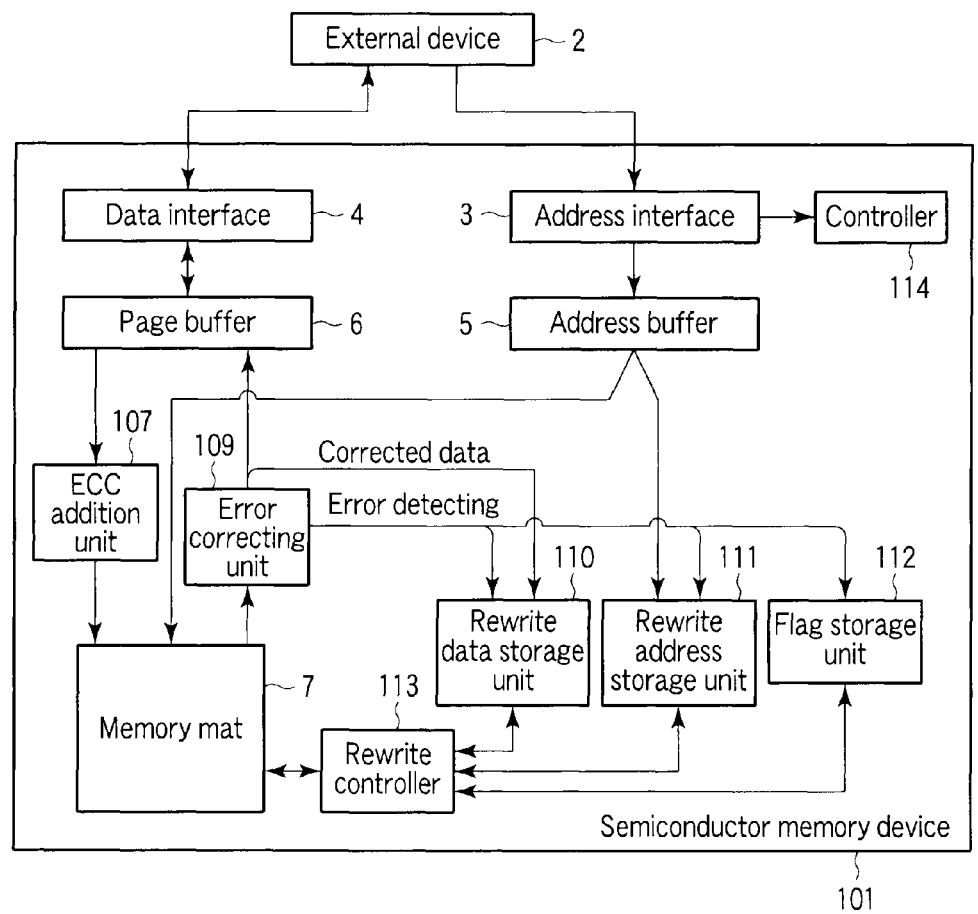
F I G. 10

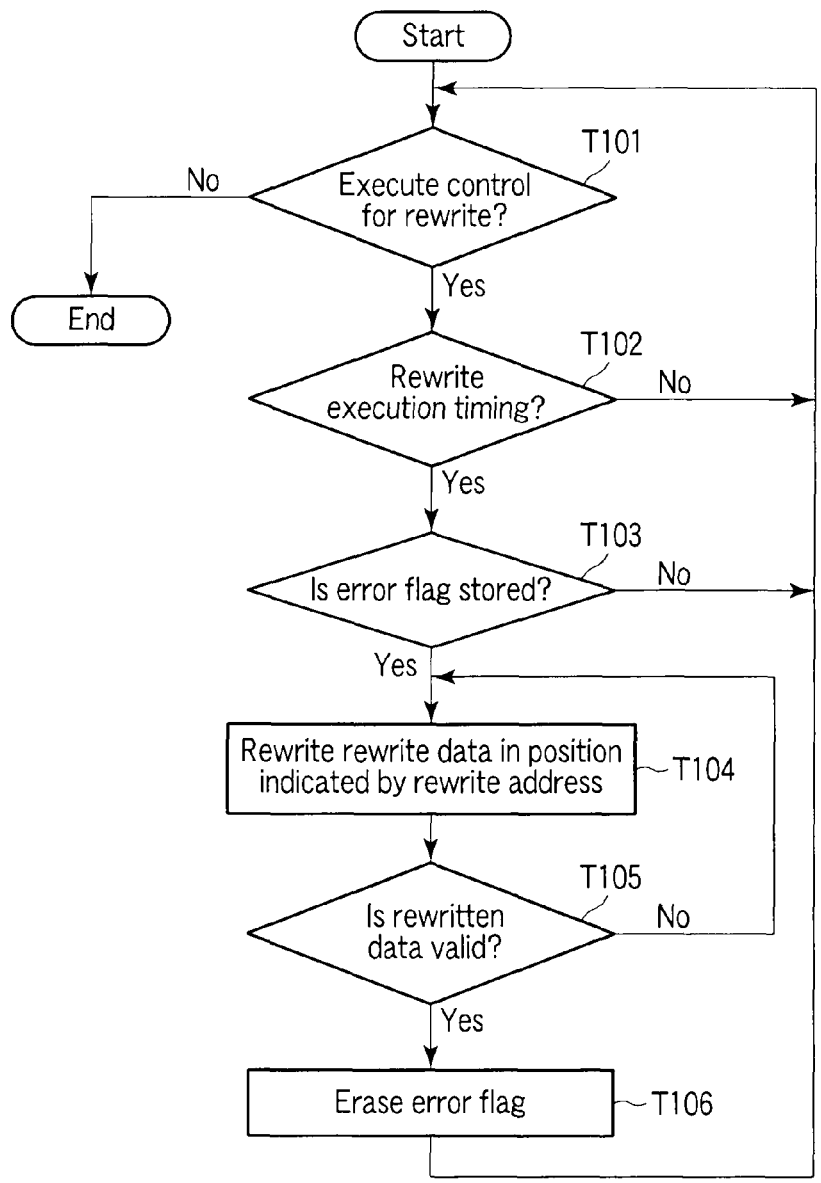
F I G. 12

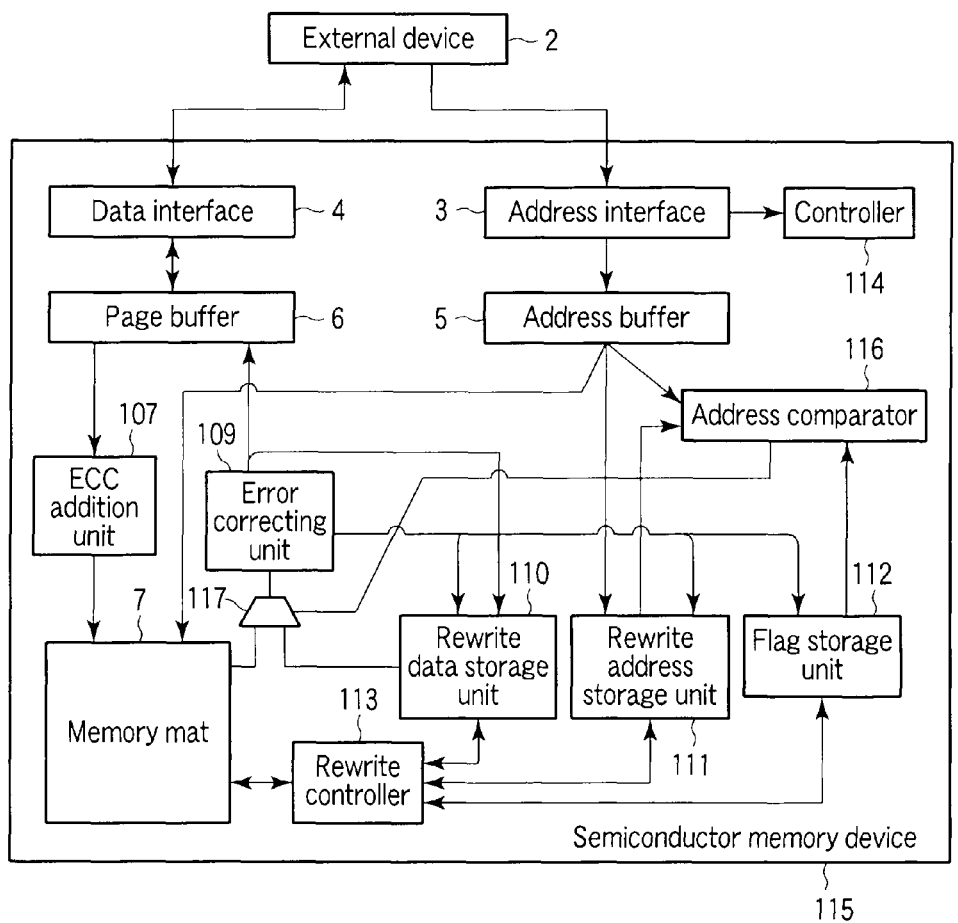
F I G. 13

SEMICONDUCTOR MEMORY DEVICE DETECTING ERROR

CROSS-REFERENCE TO RELATED APPLICATIONS

This application is based upon and claims the benefit of priority from prior Japanese Patent Applications No. 2010-171134, filed Jul. 29, 2010; and No. 2011-061557, filed Mar. 18, 2011, the entire contents of all of which are incorporated herein by reference.

FIELD

Embodiments described herein relate generally to a semiconductor memory device.

BACKGROUND

A write error sometimes occurs in a semiconductor memory device. For example, to detect a write error, the semiconductor memory device stores data (to be referred to as first data hereinafter) which is write target data and is not written in a memory mat (memory array), in a memory device different from the memory mat, and writes the write target data in the memory mat. Then, the semiconductor memory device reads out the write target data written in the memory mat. The semiconductor memory device compares first data stored in the other memory device with the data (to be referred to as second data hereinafter) written in and read out from the memory mat, and determines whether the second data is valid.

If an error is detected in the second data (if the data is not correctly written), a normal semiconductor memory device rewrites the write target data in the memory mat. When a long write time is allowable, a rewrite operation is allowed to produce a delay in a processing time. However, if it is necessary to sequentially write data in the memory mat and a throughput is important, a processing delay caused by this rewrite operation may pose a problem. Also, if the rewrite operation is performed when sequentially reading out second data, a memory controller or processor (e.g., a central processing unit) waits until the rewrite operation is complete. Consequently, a processing delay occurs in, e.g., a real-time application, and this waiting state may make it difficult to ensure real-time properties.

In addition, an error such as a cell inversion error sometimes occurs in the semiconductor memory device. If this error has occurred, the semiconductor memory device executes an operation of correcting the error of data read out from the memory mat, and rewriting corrected data in the memory mat.

When a long data read time is allowable, this rewrite operation is allowed to produce a delay in data read or write. However, if the above-mentioned rewrite operation is executed when it is necessary to sequentially perform data read or write and a throughput is important, the memory controller or processor waits during this rewrite operation and may produce a delay in data read or write. In the real-time application, for example, this waiting state sometimes makes it difficult to ensure the real-time properties.

Furthermore, when the semiconductor memory device includes a function of correcting an error in readout data, the number of error bits may increase to make error correction impossible if the above-mentioned rewrite operation is not performed.

BRIEF DESCRIPTION OF THE DRAWINGS

FIG. 1 is block diagram showing an example of a configuration of a semiconductor memory device according to a first embodiment;

FIG. 6 is a block diagram showing an example of a configuration of a semiconductor memory device according to a second embodiment;

FIG. 7 is a flowchart showing an example of a writing process of the semiconductor memory device according to the second embodiment;

FIG. 8 is a flowchart showing an example of processing performed when a power supply of the semiconductor memory device according to the second embodiment is turned on;

FIG. 9 is a block diagram showing an example of a configuration of a semiconductor memory device according to the third embodiment;

FIG. 10 is a block diagram showing an example of a configuration of a semiconductor memory device according to the fourth embodiment;

FIG. 12 is a flowchart showing an example of a rewrite operation performed by a rewrite controller according to the fourth embodiment;

FIG. 13 is a block diagram showing an example of a configuration of a semiconductor memory device according to the fifth embodiment;

FIG. 17 is a flowchart showing an example of an operation of the nonvolatile memories when a power supply of the semiconductor memory device according to the sixth embodiment is turned on.

DETAILED DESCRIPTION

Figure 2:
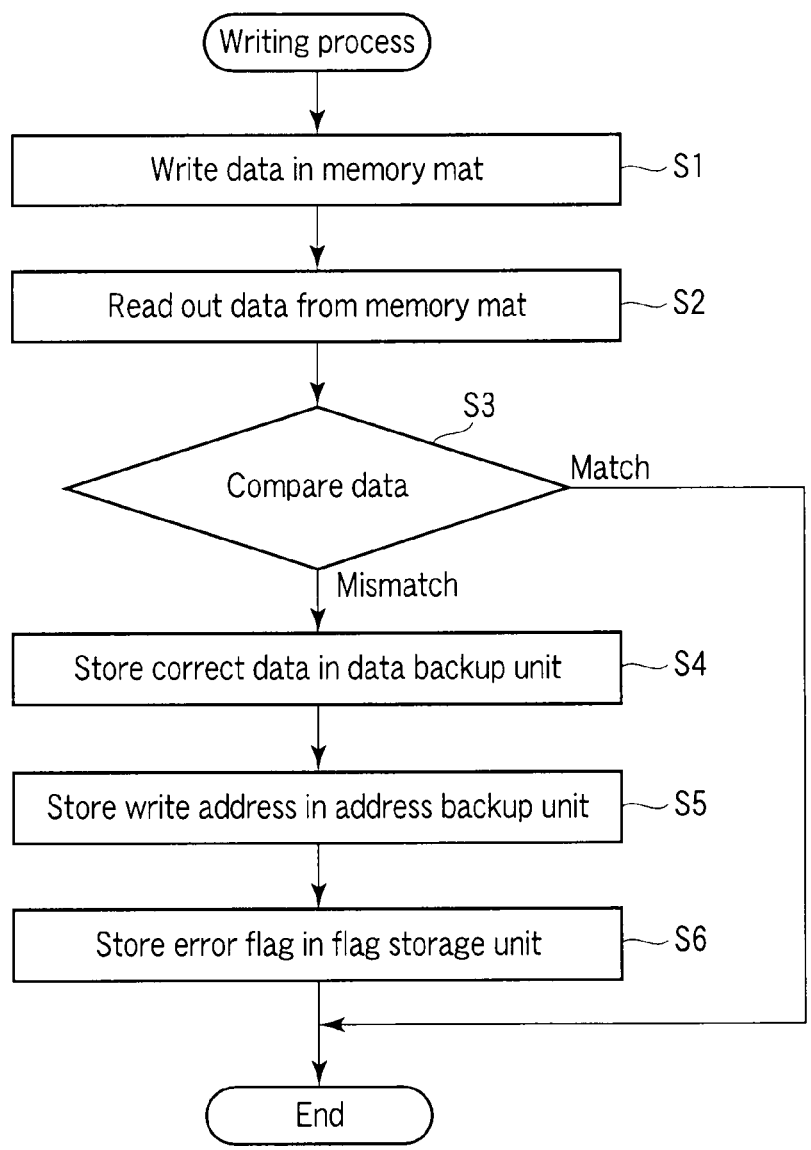
FIG. 2 is a flowchart showing an example of a writing process of the semiconductor memory device according to the first embodiment.

Embodiments will be explained below with reference to the accompanying drawing. Note that the same reference numerals denote the same elements or almost the same elements throughout the drawing, so a repetitive explanation will be omitted or an explanation will be simplified, and only different features will be explained in detail.

First Embodiment

In this embodiment, a semiconductor memory device that compares first data with second data that is read out immediately after being written, and can keep operating even if an error is detected.

In general, according to this embodiment, a semiconductor memory device includes a data comparator, a data backup unit, an address backup unit, an address comparator, and a selector. The data comparator compares first data which is write target data before write in a memory unit, with second data written in the memory unit and then read out. The data backup unit stores the first data if a comparison result from the data comparator indicates mismatch. The address backup unit stores a write address corresponding to the write target data if the comparison result from the data comparator indicates mismatch. The address comparator compares a read address corresponding to read target data with an address stored in the address backup unit. The selector selects data read out from the memory unit in accordance with the read address as the read target data if a comparison result from the address comparator indicates mismatch, and selects data read out from the data backup unit as the read target data if the comparison result from the address comparator indicates match.

FIG. 1 is a block diagram showing an example of a configuration of the semiconductor memory device according to this embodiment.

A semiconductor memory device 1 receives write target data and a write address indicating the write destination of this write target data from an external device 2 such as a CPU (Central Processing Unit), memory controller, or SoC (System-on-a-Chip).

In addition, the semiconductor memory device 1 receives a read address for read target data, and returns, to the external device 2, the read target data stored in a position indicated by this read address.

The semiconductor memory device 1 includes an address interface 3, a data interface 4, an address buffer 5, a page buffer 6, a memory mat 7 such as a memory cell array, a data comparator 8, a data backup unit 9, an address backup unit 10, a flag storage unit 11, an address comparator 12, a selector 13, and a controller 14.

The semiconductor memory device 1 includes the data comparator 8 for comparing the first data in the page buffer 6 with the second data read out from the memory mat 7. If a comparison result indicates mismatch, the semiconductor memory device 1 saves the first data in the data backup unit 9 and the address in the address backup unit 10.

The semiconductor memory device 1 compares a read address with the address in the address backup unit 10. If a comparison result indicates match, the semiconductor memory device 1 transmits the first data of the data backup unit 9 to the external device 2.

If an error is detected, the semiconductor memory device 1 sets an error flag indicating an occurrence of the error in the flag storage unit 11, and writes the first data of the data backup unit 9 in a position of the memory mat 7 which is indicated by an address in the address backup unit 10, while neither a write operation nor a read operation is performed.

Each constituent element of the semiconductor memory device 1 will be explained below.

The address interface 3 is connected to the external device 2, and functions as an address-line interface. When writing data, the address interface 3 receives the write address from the external device 2, and stores the write address in the address buffer 5. When reading out data, the address interface 3 receives the read address from the external device 2, and stores the read address in the address buffer 5.

The data interface 4 is connected to the external device 2, and inputs and outputs data by a width of, e.g., about 16 to 64 bits. When writing data, the data interface 4 stores the write target data received from the external device 2 in the page buffer 6. When reading out data, the data interface 4 transmits, to the external device 2, the read target data stored in the page buffer 6 and corresponding to a read address stored in the address buffer 5.

The address buffer 5 is a storage buffer for temporarily storing addresses corresponding to a data size to be read out from or written in the memory mat 7 at one time.

The page buffer 6 is a storage buffer for temporarily storing data up to a size such as 1,024 or 2,048 bits to be read out from or written in the memory mat 7 at one time.

The memory mat 7 is a memory main body. As the memory mat 7, it is possible to use, e.g., an MRAM (Magnetoresistive Random Access Memory), PRAM (Phase change Random Access Memory), ReRAM (Resistive Random Access Memory), FeRAM (Ferroelectric Random Access Memory), NAND type flash memory, or NOR type flash memory.

In a write operation, the write target data in the page buffer 6 is written in a position of the memory mat 7, which is indicated by the address in the address buffer 5.

To detect a write error, the data comparator 8 reads out the first data from the page buffer 6, and the second data from the memory mat 7. The data comparator 8 compares the first data with the second data, and determines whether the second data is valid (i.e., whether data write is correctly executed).

If an error is detected in the second data, the data comparator 8 stores the first data compared with the second data in the data backup unit 9, and stores the address corresponding to the write target data in the address backup unit 10.

Also, if the error is detected in the second data, the data comparator 8 stores an error flag indicating an occurrence of the error in the flag storage unit 11.

If the error is detected in the second data, the data backup unit 9 stores the first data compared with this second data. That is, the data backup unit 9 stores valid data to be written in the memory mat 7. For example, the data backup unit 9 stores data for each write size or each read size, like the page buffer 5. The data backup unit 9 can store data having a read size of 1 or more.

If the error is detected in second data, the address backup unit 10 stores the write address corresponding to this second data. The address backup unit 10 can store addresses corresponding to a read size of 1 or more.

The data backup unit 9 and address backup unit 10 respectively store the first data compared with the second data in which the error is detected and the address of the first data, such that the first data and its address are associated with each other.

For example, the first data and its address are respectively additionally written in the data backup unit 9 and address backup unit 10. This makes it possible to recognize the first data and its address based on storage sequences in the data backup unit 9 and address backup unit 10.

Note that it is also possible to integrate the data backup unit 9 and address backup unit 10 into a single storage unit, and store the first data and its address in the same entry in this single storage unit.

As each of the data backup unit 9 and address backup unit 10, a register including a flip-flop circuit or the like is used.

If an error occurs in a stored content of the memory mat 7, the flag storage unit 11 stores the error flag indicating an occurrence of the error. That is, the error flag indicates data mismatch. For example, the flag storage unit 11 stores "1" (the error flag) when the error is detected, and "0" when no error is detected. A register or the like is used as the flag storage unit 11.

When the error flag is stored in the flag storage unit 11 in a read operation, the address comparator 12 compares the address in the address buffer 6 with the address in the address backup unit 10. If the address in the address buffer 6 matches the address in the address backup unit 10, the address comparator 12 transmits, to the selector 13, notification information for instructing the selector 13 to read out data from the data backup unit 9 based on the matched address. For example, the address comparator 12 makes the notification information including backup position information indicating a position in the data backup unit 9 where data to be read out is stored. This backup position information can be generated based on, e.g., a storage position of the address in the address backup unit 10.

In response to the notification information from the address comparator 12, the selector 13 reads out the read target data from the memory mat 7 or data backup unit 9, and stores the read target data in the page buffer 4.

More specifically, if the error flag is stored in the flag storage unit 11 and the address stored in the address backup unit 10 matches the read address stored in the address buffer 5, the selector 13 reads out the read target data corresponding to this read address from the data backup unit 9. Then, the selector 13 stores the read target data read out from the data backup unit 9 in the page buffer 6.

On the other hand, if no error flag is stored in the flag storage unit 11 or if the address stored in the address backup unit 10 does not match the read address stored in the address buffer 5, the selector 13 reads out the read target data corresponding to the read address from the memory mat 7. Then, the selector 13 stores the read target data read out from the memory mat 7 in the page buffer 6.

The controller 14 performs control operations for the various kinds of constituent elements of the semiconductor memory device 1.

For example, if the error flag is stored in the flag storage unit 11, the controller 14 executes a process of rewriting, in the memory mat 7, the data stored in the data backup unit 9, based on the address stored in the address backup unit 10.

The controller 14 performs this rewrite operation in a period during which neither the read operation nor the write operation is executed. The rewrite timing can freely be set. For example, the rewrite operation is voluntarily executed by the controller 14, or the rewrite operation is executed by the external device 2 for every predetermined time.

As an example, the controller 14 counts clocks in a period during which neither the read operation nor the write operation is performed, and executes the rewrite operation if the count becomes larger than a preset threshold value.

Alternatively, the controller 14 causes a timer to measure a time during which neither the read operation nor the write operation is performed, and executes the rewrite operation if the measured time becomes larger than a threshold value.

The threshold value to be used in the rewrite operation is obtained in accordance with an elapsed time that decreases both of probabilities of occurrences of the read operation and the write operation, based on measurement values of elapsed times during which neither the read operation nor the write operation is performed, and measurement values of the probabilities of the occurrences of the read operation and the write operation.

For example, like the controller 14, the external device 2 detects an execution timing of the rewrite operation, and, if the controller 14 intends to perform the rewrite operation, inhibits the write operation and the read operation for the semiconductor memory device 1 during a predetermined period presumably required for the rewrite operation. This makes it possible to prevent a collision between the rewrite operation in the semiconductor memory device 1 and the write operation or the read operation from the external device 2.

As an example, the controller 14 may execute the rewrite operation when a shut down command is received by the semiconductor memory device 1.

FIG. 2 is a flowchart showing an example of a writing process (operation) of the semiconductor memory device 1 according to this embodiment.

In step S1, the semiconductor memory device 1 writes the first data in the memory mat 7 based on the address.

In step S2, the semiconductor memory device 1 reads out the second data from the memory mat 7 based on the same address.

In step S3, the semiconductor memory device 1 compares the first data with the second data.

If the comparison result indicates match, the writing process is terminated.

If the comparison result indicates mismatch, the process advances to step S4, and the semiconductor memory device 1 stores the first data (correct data) in the data backup unit 9. In step S5, the semiconductor memory device 1 stores the write address in the address backup unit 10. In step S6, the semiconductor memory device 1 stores the error flag in the flag storage unit 11.

After the writing process, a next process is executed.

Note that the execution order of steps S4 to S6 can freely be changed, and they can also be executed in parallel.

Figure 3:
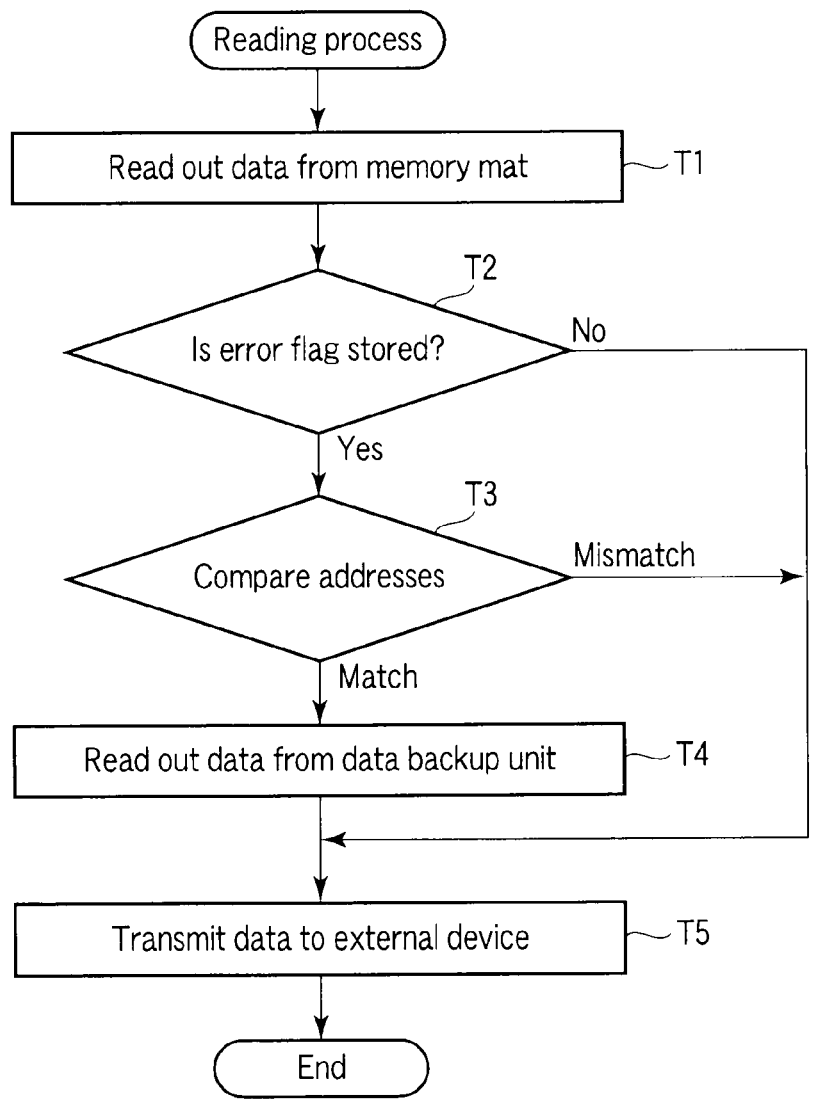
FIG. 3 is a flowchart showing a first example of a reading process of the semiconductor memory device according to the first embodiment.

FIG. 3 is a flowchart showing a first example of a reading process of the semiconductor memory device 1 according to this embodiment.

In step T1, the semiconductor memory device 1 reads out the read target data from the memory mat 7 based on the read address.

In step T2, the semiconductor memory device 1 determines whether the error flag is stored in the flag storage unit 11.

If the error flag is stored, the process advances to step T3, and the semiconductor memory device 1 compares the read address with the address stored in the address backup unit 10, and determines whether the two addresses match.

If the read address matches the address in the address backup unit 10, the process advances to step T4, and the semiconductor memory device 1 reads out data corresponding to the read address from the data backup unit 9.

If no error flag is stored in the flag storage unit 11 in step T2, or if the two addresses do not match in step T3, the process advances to step T5, and the semiconductor memory device 1 directly transmits the data read out from the memory mat 7 to the external device 2. If the error flag is stored in the flag storage unit 11 and the two addresses match, the semiconductor memory device 1 replaces the data read out from the memory mat 7 with the data read out from the data backup unit 9, and transmits the data read out from the data backup unit 9 to the external device 2.

After the reading process, a next process is executed.

Figure 4:
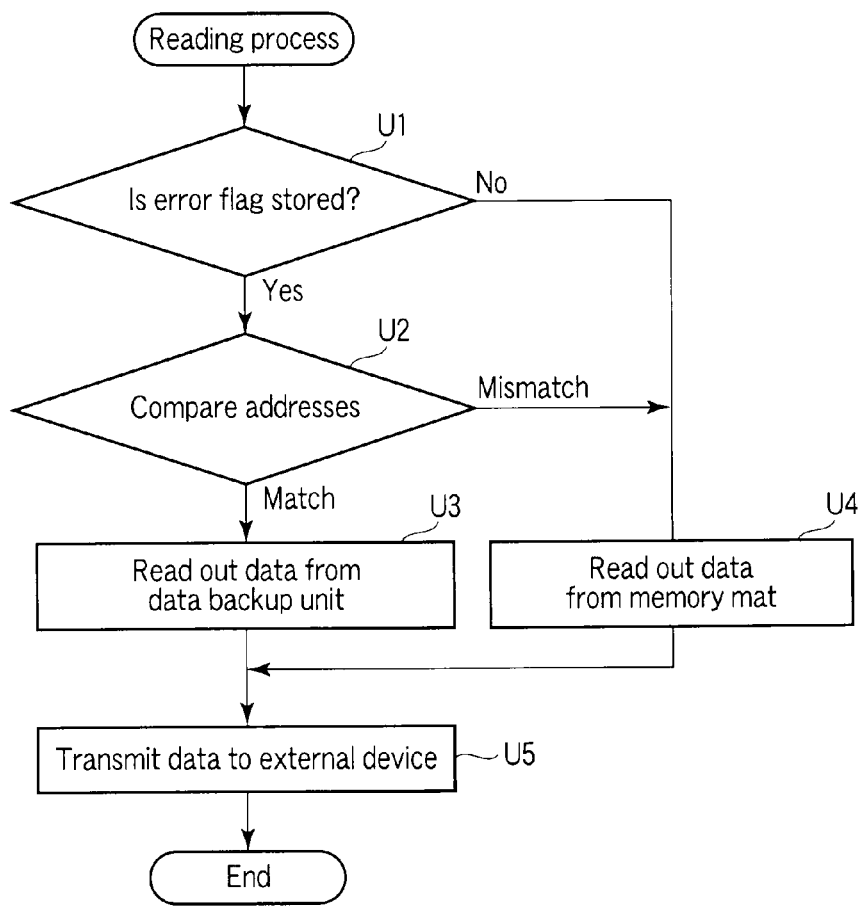
FIG. 4 is a second example of a reading process of the semiconductor memory device according to the first embodiment.

FIG. 4 is a flowchart showing a second example of a reading process of the semiconductor memory device 1 according to this embodiment. This example shown in FIG. 4 differs from the example shown in FIG. 3 in the sequence of the process of reading out the data from the memory mat 7.

In step U1, the semiconductor memory device 1 determines whether the error flag is stored in the flag storage unit 11.

If the error flag is stored, the process advances to step U2, the semiconductor memory device 1 compares the read address with an address stored in the address backup unit 10, and determines whether the two addresses match.

If the read address matches the address in the address backup unit 10, the process advances to step U3, and the semiconductor memory device 1 reads out data corresponding to the read address from the data backup unit 9. After that, the process advances to step U5.

On the other hand, if no error flag is stored in step U1, or if the two addresses do not match in step U2, the process advances to step U4, and the semiconductor memory device 1 reads out data corresponding to the read address from the memory mat 7. After that, the process advances to step U5.

In step U5, the semiconductor memory device 1 transmits the read target data to the external device 2.

After the reading process, a next process is executed.

Figure 5:
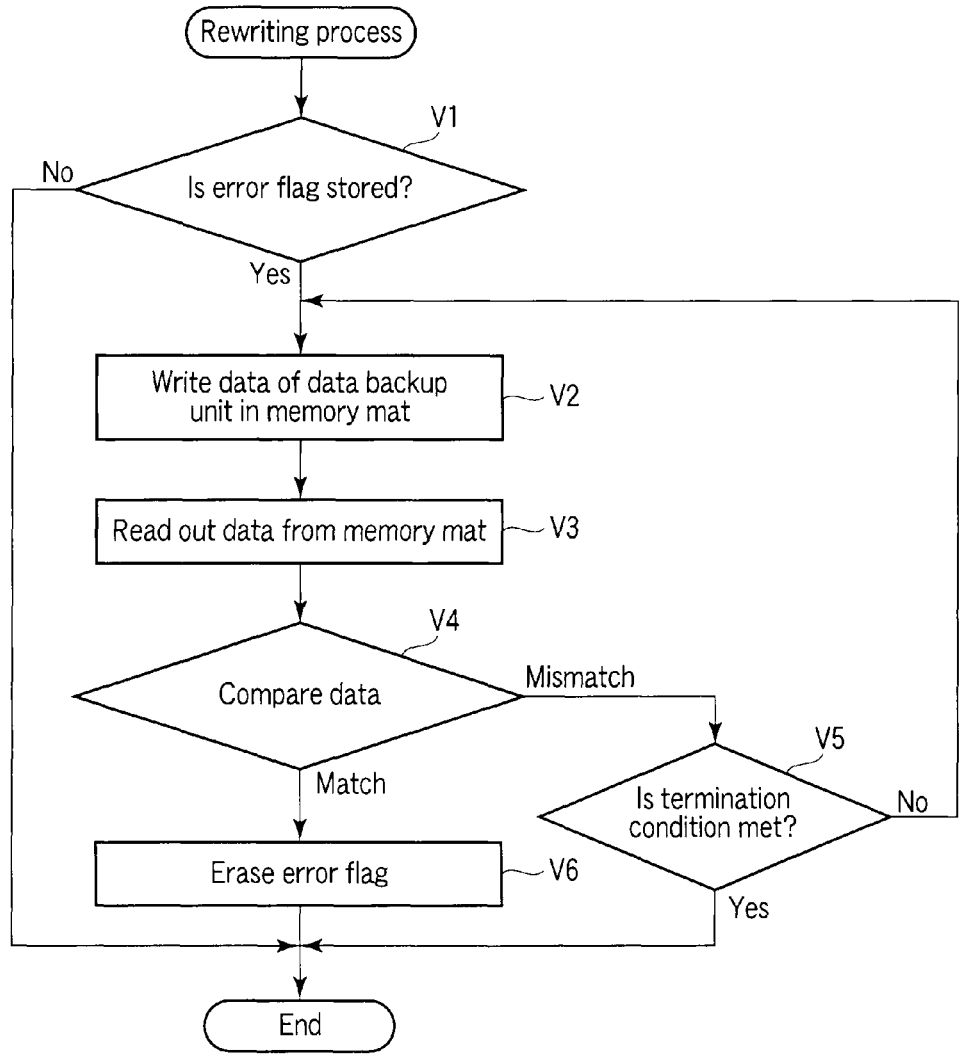
FIG. 5 is a flowchart showing an example of a rewriting process of the semiconductor memory device according to the first embodiment.

FIG. 5 is a flowchart showing an example of a rewriting process of the semiconductor memory device 1 according to this embodiment. This rewrite operation is executed in an idling state in which neither the write operation nor the read operation is executed by the semiconductor memory device 1. A break of an operation exists even when the write operation or the read operation is continuously executed for the semiconductor memory device 1. As described previously, the semiconductor memory device 1 voluntarily executes the rewrite operation when no operation is performed for a predetermined time, or the rewrite operation is executed by reading out the rewriting process from the external device 2 for every predetermined time.

In step V1, the semiconductor memory device 1 determines whether the error flag is stored in the flag storage unit 11.

If no error flag is stored, the rewriting process is terminated.

If the error flag is stored, the process advances to step V2, and the semiconductor memory device 1 writes the data of the data backup unit 9 in the memory mat 7 based on the address in the address backup unit 10.

In step V3, the semiconductor memory device 1 reads out rewritten data from the memory mat 7 based on the same address.

In step V4, the semiconductor memory device 1 compares the rewritten data with the data read out from the data backup unit 9, and determines whether the two data match.

If the comparison result indicates mismatch, the process advances to step V5, and the semiconductor memory device 1 determines whether a termination condition of the rewriting process is met. For example, the termination condition is met if the rewritten data does not match the data read out from the data backup unit 9 although the rewrite operation to the memory mat 7 is executed a predetermined number of times or more.

If the termination condition is not met, the process returns to step V2.

If the termination condition is met, the process is terminated.

On the other hand, if the comparison result indicates match, the semiconductor memory device 1 erases the error flag from the flag storage unit 11 in step V6.

After the rewriting process, a next process is executed.

Note that steps V3 to V5 may be omitted from FIG. 5.

In this embodiment explained above, data is written in the memory mat 7 and read out immediately after write. If the data is incorrectly written, correct data is temporarily stored in the data backup unit 9 instead of immediately executing the rewrite operation. In this embodiment, succeeding the read operation or the write operation is not interrupted by the rewrite operation but is executed following preceding the read operation or the write operation.

In this embodiment, no rewrite operation is performed immediately after the occurrence of the error. Therefore, it is possible to perform high-speed processing and secure the real-time properties.

When performing a read operation in this embodiment, correct data stored in the data backup unit 9 can be transmitted to the external device 2 instead of incorrect data written in the memory mat 7.

This embodiment executes the rewrite operation in the period during which neither the write operation nor the read operation occurs. Accordingly, the write operation and the read operation are not interrupted, stopped, or made to wait by rewrite operation.

Note that in this embodiment, if the external device 2 accesses the semiconductor memory device 1 while the rewrite operation is executed, the controller 14 may also interrupt rewrite the operation. Even when access occurs from the external device 2 during the rewrite operation, therefore, it is possible to prevent a delay of the access from the external device 2.

In this embodiment, the flag storage unit 11 may be omitted. In this case, whether an error has occurred can be determined based on, e.g., whether data is stored in the data backup unit 9 or an address is stored in the address backup unit 10.

Second Embodiment

This embodiment is a modification of the above-mentioned first embodiment. In this embodiment, a semiconductor memory device in which the error flag, the data in a data backup unit 9, and the address in the address backup unit 10 are stored in nonvolatile memories will be explained.

FIG. 6 is a block diagram showing an example of a configuration of the semiconductor memory device according to this embodiment.

A semiconductor memory device 15 includes nonvolatile memories 16 to 18 in addition to the constituent elements of the semiconductor memory device 1 of the above-mentioned first embodiment.

The nonvolatile memories 16, 17, and 18 respectively store the stored contents of the data backup unit 9, the address backup unit 10, and the flag storage unit 11, before a power supply of the semiconductor memory device 15 is shut down.

When the power supply of the semiconductor memory device 15 is shut down without executing any rewrite operation and turned on again after that, the stored contents of the nonvolatile memories 16, 17, and 18 are respectively copied to the data backup unit 9, address backup unit 10, and flag storage unit 11. After the power supply is turned on, the semiconductor memory device 15 executes a rewrite operation if the error flag is stored in the flag storage unit 11.

A controller 14 may perform an operation of respectively storing the storage contents of the data backup unit 9, address backup unit 10, and flag storage unit 11 in the nonvolatile memories 16, 17, and 18, and an operation of respectively storing the stored contents of the nonvolatile memories 16, 17, and 18 in the data backup unit 9, address backup unit 10, and flag storage unit 11.

FIG. 7 is a flowchart showing an example of a writing process of the semiconductor memory device 15 according to this embodiment.

Steps W1 to W6 are the same as steps S1 to S6 described above. That is, in steps W1 to W6, the semiconductor memory device 15 writes data in the memory mat 7 and then reads out the data. If the first data and second data do not match, the semiconductor memory device 15 respectively stores the first data and its address in the data backup unit 9 and address backup unit 10, and stores the error flag in the flag storage unit 11. After that, the semiconductor memory device 15 proceeds to a next process.

In this embodiment, after the data and address are respectively stored in the data backup unit 9 and address backup unit 10 and the error flag is stored in the flag storage unit 11, the process advances to step W7, and the semiconductor memory device 15 respectively stores the stored contents of the data backup unit 9, address backup unit 10, and flag storage unit 11 in the nonvolatile memories 16, 17, and 18. After the writing process, a next process is executed.

FIG. 8 is a flowchart showing an example of processing performed when the power supply of the semiconductor memory device 15 according to this embodiment is turned on.

In step X1, the semiconductor memory device 15 accesses the nonvolatile memory 18 for the error flag.

In step X2, the semiconductor memory device 15 determines whether the error flag is stored in the nonvolatile memory 18 for the error flag.

If no error flag is stored, the semiconductor memory device 15 terminates the process.

If the error flag is stored, the process advances to step X3, and the semiconductor memory device 15 reads out the stored contents of the nonvolatile memories 16, 17, and 18, and respectively stores the readout stored contents in the data backup unit 9, address backup unit 10, and flag storage unit 11. Then, the semiconductor memory device 15 erases the stored contents of the nonvolatile memories 16 to 18.

In step X4, the semiconductor memory device 15 performs the rewriting process of the data of the data backup unit 9 in the memory mat 7 based on the address in the address backup unit 10.

In step X5, the semiconductor memory device 15 reads out the rewritten data from the memory mat 7.

In step X6, the semiconductor memory device 15 compares the rewritten data with the data read out from the data backup unit 9, and determines whether the two data match.

If the comparison result indicate mismatch, the process advances to step X7, and the semiconductor memory device 15 determines whether the termination condition of the rewriting process is met.

If the termination condition is not met, the process returns to step X4.

If the termination condition is met, the process is terminated.

On the other hand, if the comparison result indicates match, the semiconductor memory device 15 erases the error flag in the flag storage unit 11 in step X8.

After the process performed when the power supply is turned on, a process is executed.

Note that steps X4 to X8 can also be omitted from FIG. 8.

In this embodiment explained above, when the power supply of the semiconductor memory device 15 is shut down in a state in which no rewrite operation is executed and turned on again after that, the semiconductor memory device 15 can be restored to a state before the power supply is shut down.

In addition, in this embodiment, the rewrite operation can be executed after the semiconductor memory device 15 is restored to the state before the power supply is shut down.

Note that in this embodiment, the data backup unit 9, address backup unit 10, and flag storage unit 11 themselves can be nonvolatile memories instead of the nonvolatile memories 16, 17, and 18.

This embodiment includes the nonvolatile memories 16, 17, and 18 respectively dedicated for the data backup unit 9, address backup unit 10, and flag storage unit 11. However, it is also possible to freely combine the data backup unit 9, address backup unit 10, and flag storage unit 11, and freely combine the nonvolatile memories 16 to 18.

Third Embodiment

This embodiment is a modification of each of the above-mentioned first and second embodiments. Although the modification of the second embodiment will be explained below, the modification of the first embodiment is the same.

In this embodiment, a semiconductor memory device that manages a position of a bit in which an error has occurred instead of data in which the error is detected will be explained.

In general, according to this embodiment, the semiconductor memory device includes a data comparator, a backup unit, an address comparator, and a correction unit. The data comparator compares first data which is write target data before write in a memory unit, with second data written in the memory unit and then read out. The backup unit stores, if a comparison result from the data comparator indicates mismatch, a write address corresponding to the write target data and an error bit position in which the mismatch is detected. The address comparator compares a read address corresponding to read target data with an address stored in the backup unit. The correction unit reads out data from the memory unit in accordance with the read address, and, if a comparison result from the address comparator indicates match, corrects the data read out from the memory unit based on the error bit position stored in the backup unit.

FIG. 9 is a block diagram showing an example of a configuration of the semiconductor memory device according to this embodiment.

In a semiconductor memory device 19 according to this embodiment, the data backup unit 9 and nonvolatile memory 16 of the semiconductor memory device 15 according to the above-mentioned second embodiment are omitted to the above-mentioned second embodiment are omitted.

Additionally, the semiconductor memory device 19 includes a data comparator 20, address backup unit 21, and correction unit 22, instead of the data comparator 8, address backup unit 10, and selector 13 of the semiconductor memory device 15.

The data comparator 20 reads out first data from a page buffer 6 and second data read out from a memory mat 7, in order to detect a write error. The data comparator 20 compares the first data with the second data, and determines whether the second data is valid.

If the error is detected in the second data, the data comparator 20 stores, in the address backup unit 21, the address corresponding to the data in which the error is detected and an error bit position.

Also, if the error is detected in the second data, the data comparator 20 stores the error flag in the flag storage unit 11.

If the error flag is stored in the flag storage unit 11 and the address stored in the address backup unit 21 matches the read address stored in the address buffer 5, the correction unit 22 reads out the read target data corresponding to the address from the memory mat 7. In addition, based on the error bit position stored in the address backup unit 21, the correction unit 22 inverts a value of a bit of the error bit position in the read target data read out from the memory mat 7, thereby correcting the read target data.

Then, the correction unit 22 stores the corrected read target data in the page buffer 6.

On the other hand, if the error flag is stored in the flag storage unit 11 or the address stored in the address backup unit 21 does not match the read address stored in the address buffer 5, the correction unit 22 reads out the read target data corresponding to the read address from the memory mat 7. Subsequently, the correction unit 22 directly stores the read target data read out from the memory mat 7 in the page buffer 6.

Note that a rewrite operation can be performed for the memory mat 7 by using the read target data corrected by the correction unit 22 in this embodiment as well.

In this embodiment, the error bit position in data in which the error has occurred is stored instead of the data in which the error has occurred. Therefore, a storage capacity required when the error has occurred can be reduced. In this embodiment, it is also possible to simplify a circuit configuration.

Note that in this embodiment, the address backup unit 21 stores the address associated with the data in which the error has occurred and the error bit position. However, it is also possible to separate a storage unit for storing the address associated with the data in which the error has occurred, and a storage unit for storing the error bit position.

Fourth Embodiment

In this embodiment, a semiconductor memory device in which a rewrite operation of data having undergone error correction in a read operation is performed at a timing having no influence on other operations such as write and read will be explained.

In general, according to this embodiment, the semiconductor memory device includes an error correcting unit, a first storage unit, a second storage unit, and a controller. The error correcting unit performs error correction on data read out from a memory unit. The first storage unit stores data corrected by the error correcting unit. The second storage unit stores an address corresponding to the data corrected by the error correcting unit. The controller performs the rewrite operation for the memory unit based on the data stored in the first storage unit and the address stored in the second storage unit, at a timing at which neither a read operation nor write operation is executed for the memory unit.

FIG. 10 is a block diagram showing an example of a configuration of the semiconductor memory device according to this embodiment.

A semiconductor memory device 101 receives write target data from the external device 2, and a write address indicating a write destination of this write target data.

In addition, the semiconductor memory device 101 receives a read address corresponding to read target data, and returns the read target data stored in a position indicated by this read address to the external device 2.

The semiconductor memory device 101 includes the address interface 3, the data interface 4, the address buffer 5, the page buffer 6, an ECC (Error Correcting Code) addition unit 107, the memory mat 7, an error correcting (ECC: Error Checking and Correcting) unit 109, a rewrite data storage unit 110, a rewrite address storage unit 111, a flag storage unit 112, a rewrite controller 113, and a controller (decoder) 114.

The semiconductor memory device 101 executes error correction when the error is occurred in the data read out from the memory mat 7. The semiconductor memory device 101 returns the error-corrected data to the external device 2. In addition, the semiconductor memory device 101 stores the error-corrected data and its address. Then, the semiconductor memory device 101 executes rewrite the operation for the memory mat 7 based on the error-corrected data and its address, at a timing having no influence on other operations (e.g., operations including write and read and required to have real-time properties).

Each constituent element of the semiconductor memory device 101 will be explained below.

In this embodiment, the address interface 3 receives various commands (including a write command and read command) for the semiconductor memory device 101 from the external device 2, and transfers the commands to the controller 114.

The ECC addition unit 107 adds parity for error correction to the write target data in the page buffer 6 in a write operation.

In the write operation, the write target data to which the parity is added by the ECC addition unit 107 is written in that position of the memory mat 7, which corresponds to the write address in the address buffer 5.

In the read operation, the data in the position corresponding to the read address in the address buffer 5 is read out from the memory mat 7.

If no error is detected in the data read out from the memory mat 7, the error correcting unit 109 stores the correct readout data in the page buffer 6.

If the error is detected in the readout data, the error correcting unit 109 transmits error detection notification to the rewrite data storage unit 110, rewrite address storage unit 111, and flag storage unit 112.

Furthermore, if the error is detected in the readout data, the error correcting unit 109 corrects the error. The error correcting unit 109 stores the error-corrected data in the page buffer 6, and transmits the error-corrected data to the rewrite data storage unit 110.

When receiving the error detection notification from the error correcting unit 109, the rewrite data storage unit 110 stores the error-corrected data received from the error correcting unit 109. In this embodiment, the corrected data (to be referred to as "rewrite data" hereinafter) stored in the rewrite data storage unit 110 can also be erased after the rewrite operation is performed by the rewrite controller 113.

When receiving the error detection notification from the error correcting unit 109, the rewrite address storage unit 111 receives the read address corresponding to the error-corrected data from the address buffer 5, and stores the read address corresponding to the error-corrected data. In this embodiment, the address (to be referred to as "a rewrite address" hereinafter) stored in the rewrite address storage unit 111 can also be erased after the rewrite operation is performed by the rewrite controller 113.

When receiving the error detection notification from the error correcting unit 109, the flag storage unit 112 stores the error flag (rewrite flag) indicating error detection. The flag storage unit 112 stores "1" (the error flag) when the error is detected, and "0" when no error is detected. In this embodiment, the error flag stored in the flag storage unit 112 is erased after the rewrite operation is performed by the rewrite controller 113. If the error flag is stored in the flag storage unit 112, therefore, the data having undergone error correction in the read operation has not been rewritten yet.

The controller 114 controls the various kinds of constituent elements of the semiconductor memory device 101, based on the commands received from the external device 2 via the address interface 103.

The rewrite controller 113 controls a signal path and rewrite timing when rewriting the data having undergone error correction in the read operation in the memory mat 7.

For example, the rewrite controller 113 determines whether the error flag is stored in the flag storage unit 112, at the timing having no influence on other operations such as continuous read/write with respect to the semiconductor memory device 101.

If it is determined that the error flag is stored, the rewrite controller 113 executes the rewrite operation by which the rewrite data in the rewrite data storage unit 110 is written in that position of the memory mat 7, which corresponds to the rewrite address in the rewrite address storage unit 111.

After executing the rewrite operation, the rewrite controller 113 erases the error flag from the flag storage unit 112. Note that after executing the rewrite operation, the rewrite controller 113 can also erase the rewrite data and rewrite address.

In this embodiment, the rewrite controller 113 can also read out the data rewritten in the memory map 7, and compare the readout rewritten data with data before rewrite, thereby determining whether the rewrite operation is correctly performed. For example, if the rewrite operation is not correctly performed, the rewrite controller 113 may execute the rewrite operation again.

The rewrite execution timing will be explained below.

For example, the rewrite controller 113 performs the rewrite operation during the period in which neither the read operation nor the write operation for the memory mat 7 is executed. The rewrite timing can freely be set. For example, at least one of the controller 114 and rewrite controller 113 may voluntarily (autonomously) execute the rewrite operation, or the rewrite operation may be executed for every set time in accordance with an instruction from the external device 2.

As an example, the rewrite controller 113 counts clocks during a period in which neither the read operation nor the write operation is performed, and executes the rewrite operation if the count becomes larger than a preset threshold value.

Alternatively, the rewrite controller 113 causes a timer to measure a time during which neither the read operation nor the write operation is performed, and executes rewrite operation if the measured time becomes larger than a threshold value.

The threshold value to be used in the rewrite operation is obtained in accordance with an elapsed time that decreases the probability of the occurrence of the read operation and the write operation, based on the measurement value of an elapsed time during which neither the read operation nor the write operation is performed, and the measurement value of the probability of the occurrence of the read operation and the write operation.

For example, like the rewrite controller 113, the external device 2 detects a execution timing of the rewrite operation, and, if the rewrite controller 113 intends to perform the rewrite operation, inhibits the write operation and the read operation for the semiconductor memory device 101 during a predetermined period presumably required for the rewrite operation. This makes it possible to prevent a collision between the rewrite operation in the semiconductor memory device 101 and the write operation and the read operation from the external device 2.

As an example, the rewrite controller 113 may execute the rewrite operation when the controller 114 accepts an idle command or standby command for the semiconductor memory device 101.

Alternatively, the rewrite controller 113 may execute the rewrite operation when a shut down command of the power supply is received.

Note that in this embodiment, as each of the rewrite data storage unit 110, rewrite address storage unit 111, and flag storage unit 112, it is possible to use, e.g., a register or another memory device such as a DRAM (Dynamic Random Access Memory) or stack memory.

In this embodiment, the rewrite data storage unit 110 and rewrite address storage unit 111 can store a pair of rewrite data and a rewrite address or a plurality of pairs of rewrite data and rewrite addresses. When storing a plurality of pairs of rewrite data and rewrite addresses in the rewrite data storage unit 110 and rewrite address storage unit 111, the rewrite data and rewrite addresses are associated with each other. For example, data having undergone error correction in the read operation and the address of the data are respectively additionally written in the rewrite data storage unit 110 and rewrite address storage unit 111. Accordingly, the rewrite data and the rewrite address associated with each other can be recognized based on the storage sequences in the rewrite data storage unit 110 and rewrite address storage unit 111. Note that it is also possible to integrate the rewrite data storage unit 110 and rewrite address storage unit 111 into a single storage unit, and store the data having undergone error correction in the read operation and the address of the data in the same entry in the single storage unit.

In this embodiment, the rewrite controller 113 and controller 114 are different components. However, it is also possible to integrate or further divide the rewrite controller 113 and controller 114.

In this embodiment, the flag storage unit 112 may be omitted. In this case, after the rewrite operation is complete, the rewrite controller 113, for example, erases at least one of data in the rewrite data storage unit 110 and an address in the rewrite address storage unit 111. The rewrite controller 113 may determine whether to perform the rewrite operation by checking at least one of whether the rewrite data is stored in the rewrite data storage unit 110 and whether the rewrite address is stored in the rewrite address storage unit 111.

Figure 11:
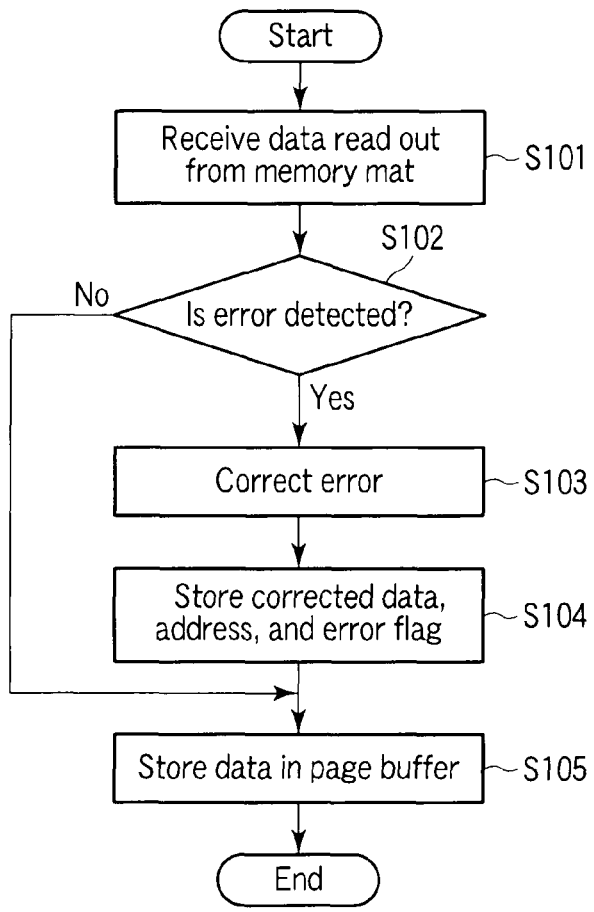
FIG. 11 is a flowchart showing an example of an operation of an error correcting unit, rewrite data storage unit, rewrite address storage unit, and flag storage unit of the semiconductor memory device according to the fourth embodiment.

FIG. 11 is a flowchart showing an example of the operation of the error correcting unit 109, rewrite data storage unit 110, rewrite address storage unit 111, and flag storage unit 112 of the semiconductor memory device 101 according to this embodiment.

In step S101, the error correcting unit 109 receives the data read out from the memory mat 7.

In step S102, the error correcting unit 109 performs error detection on the readout data.

If no error is detected in the readout data, the process advances to step S105.

If the error is detected in the readout data, the process advances to step S103, and the error correcting unit 109 corrects the error of the readout data, and transmits the error detection notification to the rewrite data storage unit 110, rewrite address storage unit 111, and flag storage unit 112.

In step S104, the rewrite data storage unit 110, rewrite address storage unit 111, and flag storage unit 112 respectively store the error-corrected data, the address corresponding to the error-corrected data, and the error flag.

In step S105, the error correcting unit 109 stores the readout data in which no error is detected or the error-corrected data in the page buffer 6.

FIG. 12 is a flowchart showing an example of the rewrite operation performed by the rewrite controller 113 according to this embodiment.

In step T101, the rewrite controller 113 determines whether to execute control for the rewrite operation. When terminating the control for the rewrite operation, the process is terminated.

When executing the control for the rewrite operation, the process advances to step T102, and the rewrite controller 113 determines whether a present time is an execution timing of the rewrite operation. If the present time is not the execution timing of the rewrite operation, the process returns to step T101.

If the present time is the execution timing of the rewrite operation, the process advances to step T103, and the rewrite controller 113 determines whether the error flag is stored in the flag storage unit 112. If no error flag is stored, the process returns to step T101.

If the error flag is stored, the process advances to step T104, and the rewrite controller 113 rewrites the rewrite data of the rewrite data storage unit 110, in that position of the memory map 7, which is indicated by the rewrite address in the rewrite address storage unit 111.

In step T105, the rewrite controller 113 compares the rewrite data stored in the rewrite data storage unit 110 with the data rewritten in the memory map 7 and read out after that, and determines whether the data read out after being rewritten is valid.

If the data read out after being rewritten is invalid, the process returns to step T104.

If the data read out after being rewritten is valid, the process advances to step T106, and the rewrite controller 113 erases the error flag stored in the flag storage unit 112. After that, the process returns to step T101.

In this embodiment explained above, a correctable error in the readout data is corrected, and the error-corrected data and its address are temporarily stored. This makes it possible to rewrite the error-corrected data without affecting other operations of the semiconductor memory device 101.

In this embodiment, the rewrite operation can be performed for a read error or retention error when the semiconductor memory device 101 is required to perform a high-speed operation.

A break of an operation of the semiconductor memory device 101 exists even when the write operation or the read operation is continuously performed for the semiconductor memory device 101. In this embodiment, when the semiconductor memory device 101 does not perform any operation for a predetermined time, the semiconductor memory device 1 voluntarily executes the rewrite operation, or the rewrite operation is executed in accordance with a rewrite command from the external device 2.

Note that in this embodiment, if no access to the semiconductor memory device 101 occurs for a set time, for example, it is possible to inhibit access to the semiconductor memory device 101 until a time necessary for rewrite elapses and execute the rewrite operation after the time. This makes it possible to prevent the collision between the rewrite operation and access from the external device 2 to the semiconductor memory device 101. The set time may also be determined based on, e.g., a memory access frequency of an application to be used.

In this embodiment, the rewrite data storage unit 110 can be omitted if the error bit can be specified by the rewrite address to be stored in the rewrite address storage unit 111.

Fifth Embodiment

This embodiment is a modification of the above-mentioned fourth embodiment. In this embodiment, a semiconductor memory device that returns the rewrite data in the rewrite data storage unit 110 as the read target data if the read target address is the same as the rewrite address in the rewrite address storage unit 111 will be explained.

FIG. 13 is a block diagram showing an example of a configuration of the semiconductor memory device according to this embodiment.

A semiconductor memory device 115 includes an address comparator 116 and selector 117 in addition to the constituent elements of the semiconductor memory device 101 according to the above-mentioned fourth embodiment.

The rewrite data storage unit 110 stores the data having undergone error correction in the read operation. The rewrite address storage unit 111 stores the address at which the error is detected in the read operation. The flag storage unit 112 stores the error flag indicating that no rewrite operation is performed on the rewrite data having undergone error correction and stored in the rewrite data storage unit 110.

The address comparator 116 compares the read target address stored in the address buffer 5 with the rewrite address in the rewrite address storage unit 111, when the error flag is stored in the flag storage unit 112 in the read operation. If the comparison result indicates match, the address comparator 116 transmits, to the selector 117, a selection instruction for selecting the rewrite data of the rewrite data storage unit 110. On the other hand, if the comparison result indicates mismatch, the address comparator 116 transmits, to the selector 117, the selection instruction for selecting the data read out from the memory mat 7.

In the read operation, the selector 117 receives the selection instruction from the address comparator 116. If this selection instruction indicates the selection of rewrite data, the selector 117 selects the rewrite data of the rewrite data storage unit 110 as the read target data corresponding to the read target address, and transmits the rewrite data to the error correcting unit 109. On the other hand, if the selection instruction indicates the selection of the data read out from the memory mat 7, the selector 117 selects the data read out from the memory mat 7 as the read target data corresponding to the read target address, and transmits the data to the error correcting unit 109.

When receiving the data read out from the memory mat 7 from the selector 117, the error correcting unit 109 performs error detection and correction explained in the above-mentioned fourth embodiment for the data read out from the memory mat 7.

Note that when receiving the rewrite data read out from the rewrite data storage unit 110 from the selector 117, the error correcting unit 109 can directly store this rewrite data in the page buffer 6, or can also perform error detection and correction explained in the above-mentioned fourth embodiment for the rewrite data.

Figure 14:
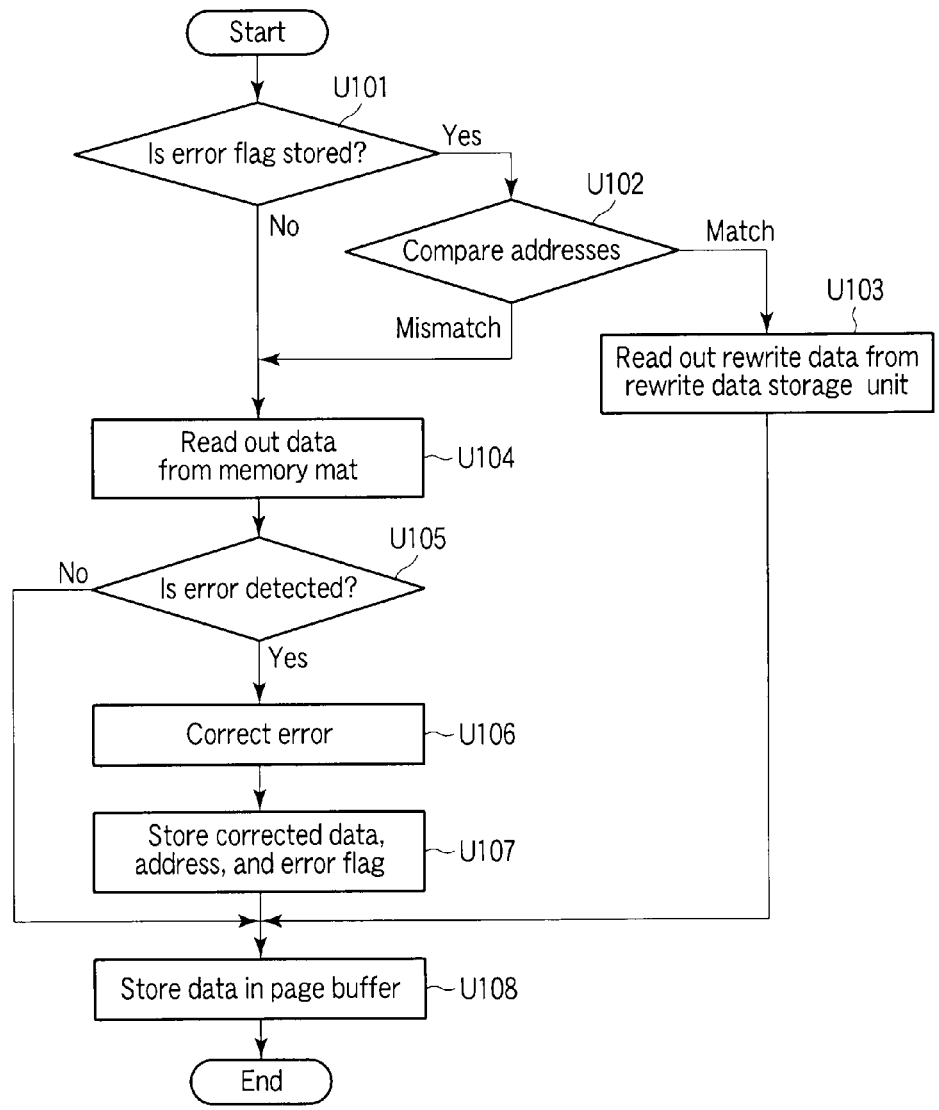
FIG. 14 is a flowchart showing an example of an operation of an address comparator and selector according to the fifth embodiment.

FIG. 14 is a flowchart showing an example of an operation of the address comparator 116 and selector 117 according to this embodiment.

In step U101, the address comparator 116 determines whether the error flag is stored in the flag storage unit 112.

If no error flag is stored in the flag storage unit 112, no read error is occurred, or the read error is corrected by a rewrite operation, so the process advances to step U104.

If the error flag is stored in the flag storage unit 112, the error is occurred in a given address, so the address comparator 116 determines in step U102 whether the read target address stored in the address buffer 5 matches the rewrite address stored in the rewrite address storage unit 111.

If the two addresses do not match, the process advances to step U104.

If the two addresses match, the process advances to step U103, and the selector 117 reads out the rewrite data stored in the rewrite data storage unit 110, instead of reading out the data from the memory mat 7, and transmits the readout data to the error correcting unit 109. The rewrite data is directly usable because the data has undergone error correction when stored in the rewrite data storage unit 110. By contrast, if the data in which the error is detected in the preceding read operation is read out from the memory mat 7 again, the number of error bits may have increased, so error correction may be impossible. If the two addresses match, therefore, the selector 117 preferentially uses the rewrite data of the rewrite data storage unit 110, instead of correcting the data read out from the memory mat 7. After that, the process advances to step U108. Note that the process may advance to step U105, and the error correcting unit 109 may perform error detection and correction on this rewrite data.

In step U104, the selector 117 reads out the data from the memory mat 7 based on the read target address stored in the address buffer 5.

In step U105, the selector 117 performs error detection on the data read out from the memory mat 7.

If no error is detected in the readout data, the process advances to step U108.

If the error is detected in the readout data, the process advances to step U106, and the error correcting unit 109 corrects the error of the readout data, and transmits the error detection notification to the rewrite data storage unit 110, rewrite address storage unit 111, and flag storage unit 112.

In step U107, the rewrite data storage unit 110, rewrite address storage unit 111, and flag storage unit 112 respectively store the error-corrected data, the address corresponding to the error-corrected data, and the error flag.

In step U108, the error correcting unit 109 stores, in the page buffer 6, the rewrite data from the rewrite data storage unit 110, the data which is read out from the memory mat 7 and in which no error is detected by the error correcting unit 109, or the data which is read out from the memory mat 7 and in which the error is corrected by the error correcting unit 109.

Note that step U104 is executed after steps U101 and U102 in FIG. 14, but step U104 may also be executed before steps U101 and U102.

In this embodiment explained above, the read target address in the address buffer 5 is compared with the rewrite address in the rewrite address storage unit 111. If the two addresses match, the rewrite data in the rewrite data storage unit 110 is transmitted as the read target data. If the error is detected in this embodiment, the corrected data stored in the rewrite data storage unit 110 is preferentially used instead of using the data read out from the memory mat 7 and corrected. This makes it possible to prevent an event in which the number of error bits in data stored in the memory mat 7 increases to make error correction impossible, and wrong data is read out.

Sixth Embodiment

This embodiment is a modification of each of the above-mentioned fourth and fifth embodiments. Although the modification of the fourth embodiment will be explained as a typical example, the modification of the fifth embodiment is the same.

In this embodiment, a semiconductor memory device in which the rewrite data, rewrite address, and error flag respectively stored in the rewrite data storage unit 110, rewrite address storage unit 111, and flag storage unit 112 are stored in nonvolatile memories and shutdown of the power supply is allowed before a rewrite operation will be explained.

Figure 15:
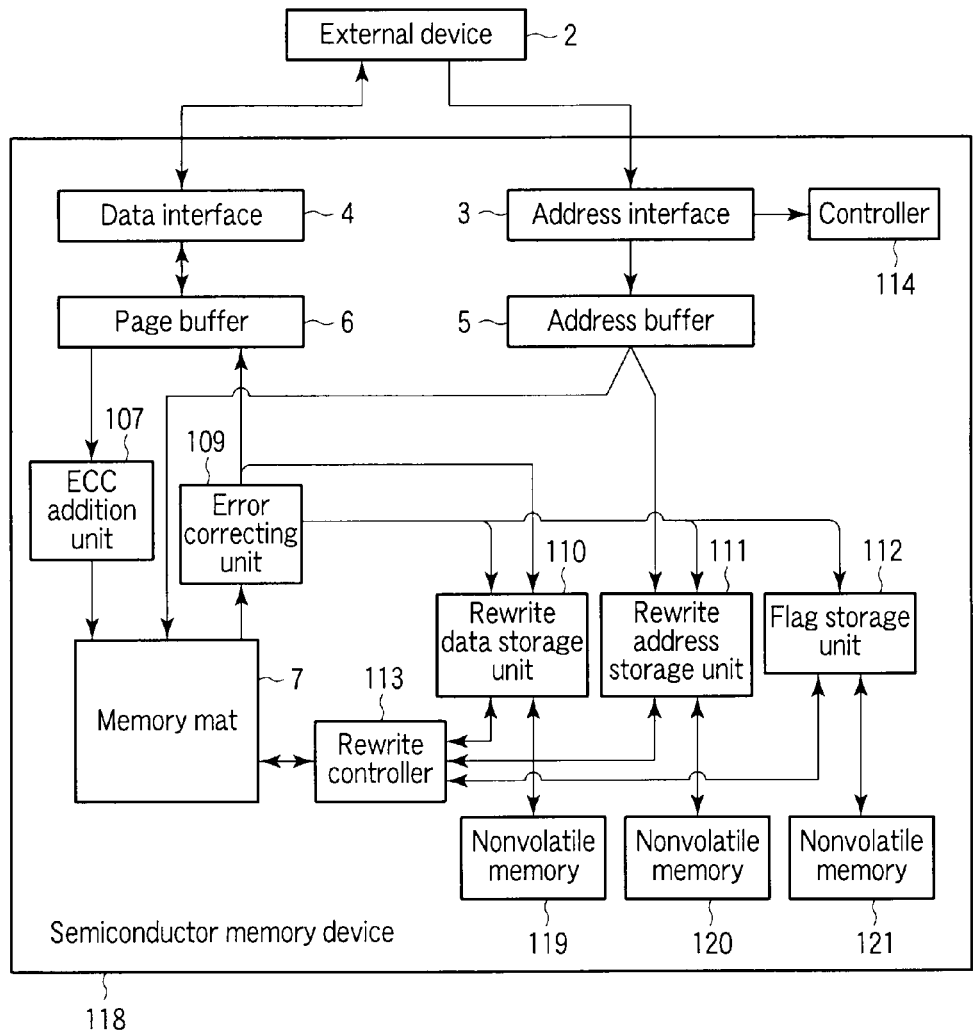
FIG. 15 is a block diagram showing an example of a configuration of a semiconductor memory device according to a sixth embodiment.

FIG. 15 is a block diagram showing an example of a configuration of the semiconductor memory device according to this embodiment.

A semiconductor memory device 118 includes nonvolatile memories 119 to 121 in addition to the constituent elements of the semiconductor memory device 101 of the above-mentioned fourth embodiment.

The nonvolatile memories 119, 120, and 121 respectively store the stored contents of the rewrite data storage unit 110, rewrite address storage unit 111, and flag storage unit 112 before, e.g., the power supply of the semiconductor memory device 118 is shut down.

When the power supply of the semiconductor memory device 118 is shut down without executing any rewrite operation and turned on again after that, the stored contents of the nonvolatile memories 119, 120, and 121 are respectively copied to the rewrite data storage unit 110, rewrite address storage unit 111, and flag storage unit 112, thereby recovering the semiconductor memory device 118. The rewrite controller 113 of the semiconductor memory device 118 executes control for the rewrite operation if the error flag is stored in the flag storage unit 112 after the power supply is turned on.

At least one of the rewrite controller 113 and the controller 114 may perform an operation of respectively storing the stored contents of the rewrite data storage unit 110, rewrite address storage unit 111, and flag storage unit 112 in the nonvolatile memories 119, 120, and 121, and an operation of respectively storing the stored contents of the nonvolatile memories 119, 120, and 121 in the rewrite data storage unit 110, rewrite address storage unit 111, and flag storage unit 112.

Figure 16:
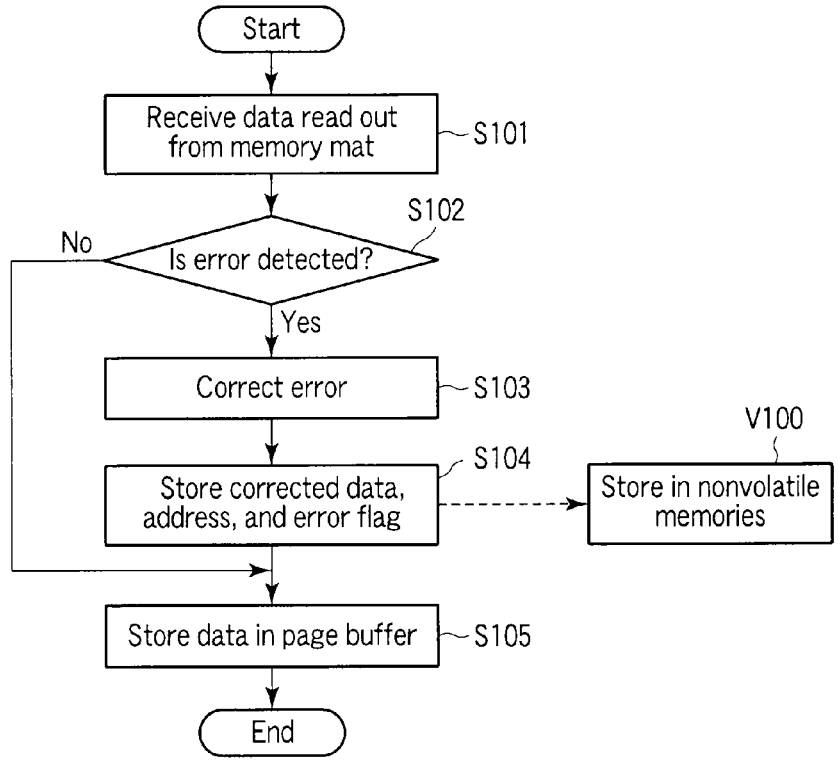
FIG. 16 is a flowchart showing an example of an operation of nonvolatile memories in a read operation of the semiconductor memory device according to the sixth embodiment.

FIG. 16 is a flowchart showing an example of an operation of the nonvolatile memories 119 to 121 in a read operation of the semiconductor memory device 118 according to this embodiment.

Steps S101 to S105 have been explained in FIG. 11 described earlier. If the error is detected in the data read out from the memory mat 7, the error-corrected data is output, and the error-corrected data, the address, and the error flag are respectively stored in the rewrite data storage unit 110, rewrite address storage unit 111, and flag storage unit 112. After that, in step V100, the contents of the rewrite data storage unit 110, rewrite address storage unit 111, and flag storage unit 112 are respectively stored in the dedicated nonvolatile memories 119, 120, and 121.

Figure 17:
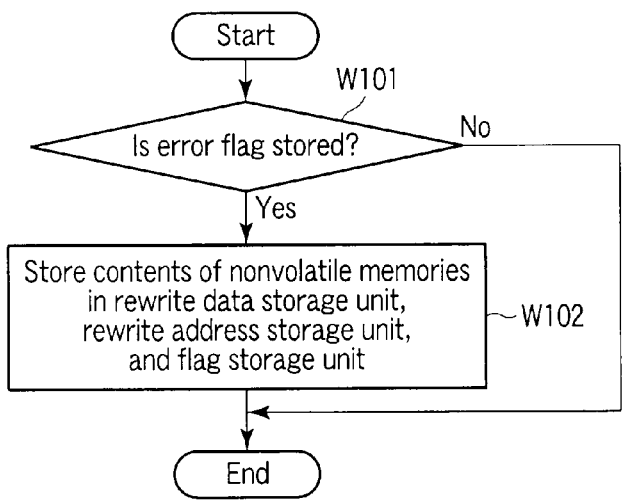

FIG. 17 is a flowchart showing an example of an operation of the nonvolatile memories 119 to 121 when the power supply of the semiconductor memory device 118 according to this embodiment is turned on.

In step W101, the semiconductor memory device 118 determines whether the error flag is stored in the nonvolatile memory 121 for the error flag.

If no error flag is stored, the operation performed for the nonvolatile memories 119 to 121 when the power supply is turned on is terminated.

If the error flag is stored, the process advances to step W102, and the rewrite data storage unit 110, rewrite address storage unit 111, and flag storage unit 112 respectively store the stored contents of the nonvolatile memories 119, 120, and 121.

Note that the stored contents of the nonvolatile memories 119 to 121 may be erased after the data are respectively copied from the nonvolatile memories 119, 120, and 121 to the rewrite data storage unit 110, rewrite address storage unit 111, and flag storage unit 112.

After the operation shown in FIG. 17, the operation explained in FIG. 12 described earlier is executed.

In this embodiment explained above, when the power supply of the semiconductor memory device 118 is shut down while no rewrite operation is executed and turned on again after that, the semiconductor memory device 118 can be restored to a state before the power supply is shut down.

In addition, in this embodiment, the rewrite operation can be executed after the semiconductor memory device 118 is restored to the state before the power supply is shut down.

Note that in this embodiment, the rewrite data storage unit 110, rewrite address storage unit 111, and flag storage unit 112 themselves may be nonvolatile memories, instead of using the nonvolatile memories 119 to 121.

This embodiment uses the nonvolatile memories 119, 120, and 121 respectively dedicated for the rewrite data storage unit 110, rewrite address storage unit 111, and flag storage unit 112. However, it is also possible to freely combine the rewrite data storage unit 110, rewrite address storage unit 111, and flag storage unit 112, and freely combine the nonvolatile memories 119 to 121.

Seventh Embodiment

This embodiment is a modification of each of the above-mentioned fourth to sixth embodiments. Although the modification of the fourth embodiment will be explained below, the modifications of the fifth and sixth embodiments are the same.

In this embodiment, a semiconductor memory device that manages the position of a bit in which the error is detected instead of the data having undergone error correction in the read operation will be explained.

Figure 18:
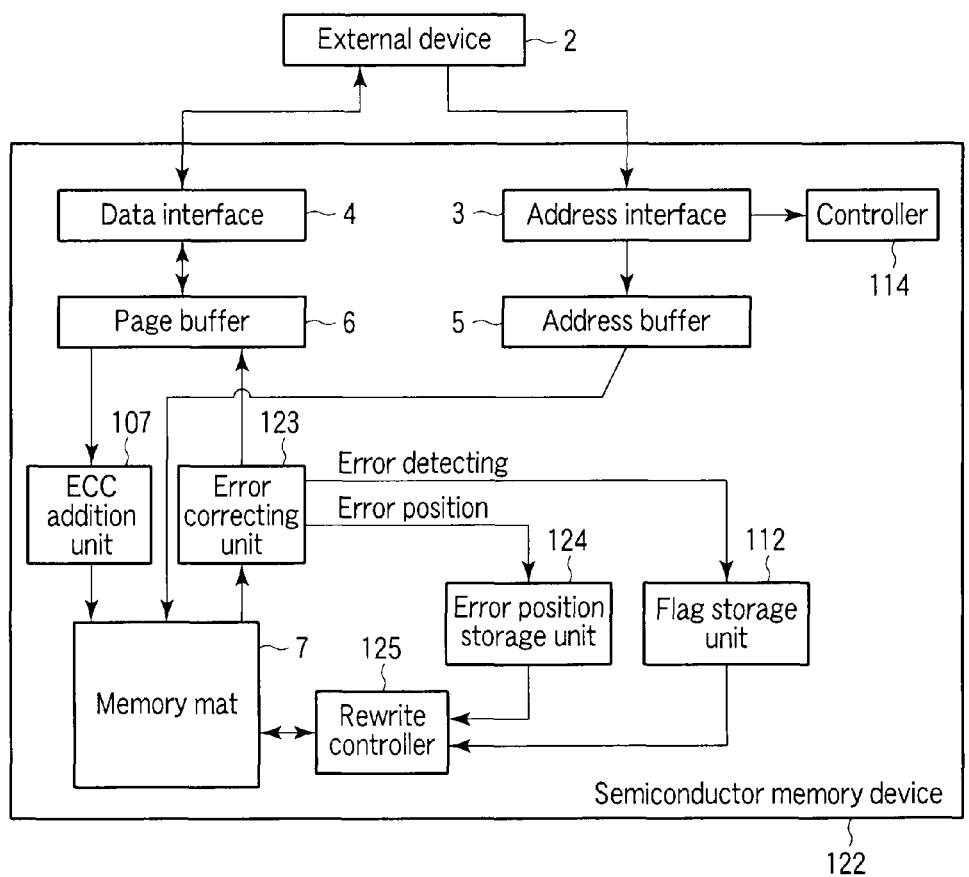
FIG. 18 is a block diagram showing an example of a configuration of a semiconductor memory device according to a seventh embodiment.

FIG. 18 is a block diagram showing an example of a configuration of the semiconductor memory device according to this embodiment.

A semiconductor memory device 122 according to this embodiment includes an error correcting unit 123, error position storage unit 124, and rewrite controller 125, instead of the error correcting unit 109, rewrite data storage unit 110, and rewrite controller 113 of the semiconductor memory device 101 according to the above-mentioned fourth embodiment. Also, the rewrite address storage unit 111 of the semiconductor memory device 101 according to the fourth embodiment is omitted from the semiconductor memory device 122.

In the read operation, the error correcting unit 123 performs error detection and correction on the data read out from a memory mat 7. The error correcting unit 123 stores the data in which no error is detected or error-corrected data in a page buffer 6.

If the error is detected, the error correcting unit 123 stores the error flag in the flag storage unit 112. In addition, if the error is detected, the error correcting unit 123 stores, in the error position storage unit 124, the bit position (e.g., the address and the position of the error bit in the address) of the memory mat 7, in which the error is occurred.

The rewrite controller 125 determines whether the error flag is stored in the flag storage unit 112, at the execution timing having no influence on the operation of the semiconductor memory device 122.

If the error flag is stored, the rewrite controller 125 inverts the value (e.g., the bit value) of the data in the memory mat 7, which corresponds to the bit position stored in the error position storage unit 124, thereby rewriting the corrected data.

After that, the rewrite controller 125 erases the error flag of the flag storage unit 112. Note that after executing a rewrite operation, the rewrite controller 125 may erase the stored contents of the error position storage unit 124.

In this embodiment, the error position is stored instead of the error-corrected data. In this case, it is possible to reduce a storage capacity required when the error is detected in the read operation. Also, this embodiment can simplify a circuit configuration.

In this embodiment, the error bit position and the address corresponding to the data in which the error is detected may be stored in the error position storage unit 124, such that the error bit position and address are associated with each other. This makes it possible to use the address comparator 116 as in the above-mentioned fifth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
a data comparator which compares first data which is write target data before write in a memory unit, with second data written in the memory unit and then read out;
a data backup unit which stores the first data if a comparison result from the data comparator indicates mismatch;
an address backup unit which stores a write address corresponding to the write target data if the comparison result from the data comparator indicates mismatch;
an address comparator which compares a read address corresponding to read target data with an address stored in the address backup unit;
a selector which selects data read out from the memory unit in accordance with the read address as the read target data if a comparison result from the address comparator indicates mismatch, and selects data read out from the data backup unit as the read target data if the comparison result from the address comparator indicates match; and
a controller which rewrites in the memory unit the data read out from the data backup unit selected by the selector dependent on the comparison result of the address comparator using the address stored in the address backup unit based upon the comparison result of the data comparator, if neither a write operation nor read operation executes.

2. The device according to claim 1, further comprising a flag storage unit which stores an error flag indicating an error, if the comparison result from the data comparator indicates mismatch,
wherein if the error flag is stored in the flag storage unit, the address comparator compares the read address with the address stored in the address backup unit.

3. The device according to claim 2, wherein the controller which determines whether the write operation or the read operation for the memory unit executes, if the error flag is stored in the flag storage unit.

4. The device according to claim 3, wherein the controller counts clocks in a period during which neither the write operation nor the read operation occurs, and, if the count is larger than a threshold value, writes the data read out from the data backup unit in the memory unit based on the address stored in the address backup unit.

5. The device according to claim 3, wherein the controller causes a timer to measure an elapsed time during which neither the write operation nor the read operation occurs, and, if the measured time is larger than a threshold value, writes the data read out from the data backup unit in the memory unit based on the address stored in the address backup unit.

6. The device according to claim 5, wherein the threshold value is determined by selecting an elapsed time during which a probability of occurrence of the write operation or the read operation is lower than an arbitrary value, based on measurement values of elapsed times during which neither the write operation nor the read operation occurs and probabilities of occurrence of the write operation or the read operation corresponding to the elapsed times.

7. The device according to claim 3, wherein in accordance with a command received from an external device, the controller writes the data read out from the data backup unit in the memory unit based on the address stored in the address backup unit.

8. The device according to claim 1, further comprising:
a temporary data storage unit which temporarily stores the first data; and
a temporary address storage unit which temporarily stores the read address,
wherein the data comparator compares the first data stored in the temporary data storage unit with the second data corresponding to the first data read out from the memory unit, and
the address comparator compares the read address stored in the temporary address storage unit with the address stored in the address backup unit.

9. The device according to claim 1, wherein the data backup unit and the address backup unit respectively store the first data found to cause mismatch by the data comparator and the write address corresponding to the first data, such that the first data and the write address are associated with each other.

10. The device according to claim 1, further comprising:
a first nonvolatile memory which stores a stored content of the data backup unit before a power supply is shut down; and
a second nonvolatile memory which stores a stored content of the address backup unit before the power supply is shut down,
wherein the data backup unit stores a stored content of the first nonvolatile memory after the power supply is turned on again, and
the address backup unit stores a stored content of the second nonvolatile memory after the power supply is turned on again.

11. The device according to claim 1, further comprising an error correcting unit which performs error correction on data read out from the memory unit
wherein the data backup unit stores data corrected by the error correcting unit, and
the address backup unit stores an address corresponding to the data corrected by the error correcting unit.

12. The device according to claim 11, wherein the controller performs the rewrite operation if a duration in which neither the read operation nor the write operation is executed for the memory unit exceeds a threshold value.

13. The device according to claim 11, further comprising a flag storage unit which stores an error flag indicating that the error correction is performed by the error correcting unit, and the rewrite operation corresponding to the error correction is not executed for the memory unit,
wherein the controller performs the rewrite operation if the error flag is stored in the flag storage unit.

14. The device according to claim 11, further comprising:
a first nonvolatile memory which stores a stored content of the data backup unit before a power supply is shut down; and
a second nonvolatile memory which stores a stored content of the address backup unit before the power supply is shut down,
wherein the data backup unit stores a stored content of the first nonvolatile memory after the power supply is turned on again, and
the address backup unit stores a stored content of the second nonvolatile memory after the power supply is turned on again.

15. The device according to claim 11, wherein the controller counts clocks in a period during which neither the write operation nor the read operation occurs, and, if the count is larger than a threshold value, performs the rewrite operation for the memory unit based on the data stored in the data backup unit and the address stored in the address backup unit.

16. The device according to claim 11, wherein the controller causes a timer to measure an elapsed time during which neither the write operation nor the read operation occurs, and, if the measured time is larger than a threshold value, performs the rewrite operation for the memory unit based on the data stored in the data backup unit and the address stored in the address backup unit.

17. The device according to claim 11, wherein the data backup unit and the address backup unit respectively store the data corrected by the error correcting unit and the address corresponding to the data corrected by the error correcting unit, such that the data corrected by the error correcting unit and the address corresponding to the data are associated with each other.

18. A method for controlling a semiconductor memory device, comprising:
comparing first data which is write target data before write in a memory unit, with second data written in the memory unit and then read out;
storing the first data in a data backup unit if a comparison result from the data comparing indicates mismatch;
storing a write address corresponding to the write target data in an address backup unit if the comparison result from the data comparing indicates mismatch;
comparing a read address corresponding to read target data with an address stored in the address backup unit;
selecting data read out from the memory unit in accordance with the read address as the read target data if a comparison result from the address comparing indicates mismatch, and selecting data read out from the data backup unit as the read target data if the comparison result from the address comparing indicates match; and
rewriting the data, read out from the data backup unit selected based upon the comparison result of the address comparing, in the memory unit using the address stored in the address backup unit based upon the comparison result of the data comparison, if neither a write operation nor read operation executes.

19. The method according to claim 18, further comprising:
storing an error flag indicating an error in a flag storage unit if the comparison result from the data comparing indicates mismatch; and
comparing the read address with the address stored in the address backup unit if the error flag is stored in the flag storage unit.

20. The method according to claim 19, further comprising determining whether the write operation or the read operation for the memory unit executes, if the error flag is stored in the flag storage unit.

\* \* \* \* \*